(12) United States Patent
Mao et al.

(10) Patent No.: US 11,190,042 B2
(45) Date of Patent: Nov. 30, 2021

(54) WIRELESS CHARGING TRANSMITTING APPARATUS, TRANSMITTING METHOD, AND WIRELESS CHARGING SYSTEM

(71) Applicant: HUAWEI TECHNOLOGIES CO., LTD., Guangdong (CN)

(72) Inventors: Yunhe Mao, Shenzhen (CN); Yanding Liu, Dongguan (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/157,697

(22) Filed: Jan. 25, 2021

(65) Prior Publication Data
US 2021/0152013 A1     May 20, 2021

Related U.S. Application Data

(63) Continuation of application No. PCT/CN2019/079864, filed on Mar. 27, 2019.

(51) Int. Cl.
*H02J 7/06* (2006.01)
*H02J 50/10* (2016.01)
(Continued)

(52) U.S. Cl.
CPC .............. *H02J 7/06* (2013.01); *B60L 53/122* (2019.02); *H02J 50/10* (2016.02); *H02M 7/5387* (2013.01); *H02J 2207/20* (2020.01)

(58) Field of Classification Search
CPC .......... H02J 7/06; H02J 50/10; H02J 2207/20; B60L 53/122; H02M 7/5387
(Continued)

(56) References Cited

U.S. PATENT DOCUMENTS 6,462,962 B1 * 10/2002 Cuk ................. H02M 3/33538
363/16
9,571,005 B2   2/2017 Pahlevaninezhad et al.
(Continued)

FOREIGN PATENT DOCUMENTS

CN       102969776 A     3/2013
CN       104702113 A     6/2015
(Continued)

OTHER PUBLICATIONS

PCT International Search Report and Written Opinion issued in International Application No. PCT/CN2019/079864 dated Jan. 2, 2020, 12 pages (partial English translation).
(Continued)

*Primary Examiner* — Richard Isla
*Assistant Examiner* — Dung V Bui
(74) *Attorney, Agent, or Firm* — Fish & Richardson P.C.

(57) ABSTRACT

This application discloses wireless charging apparatuses, methods, and systems. One apparatus includes: a direct current to alternating current (DC-to-AC) inverter circuit configured to invert a DC output by a DC power supply to an AC; a compensation circuit configured to compensate the AC output by the DC-to-AC inverter circuit and send the AC obtained after the compensation to a transmitting coil; the transmitting coil configured to receive the AC and generate an AC magnetic field; an impedance adjustment circuit comprising one or more inductive branches; and a controller configured to control on or off of the switch in the inductive branch to change a current flowing out of the lagging bridge arm to enable a controllable switching transistor of the lagging bridge arm to implement zero-voltage switching.

19 Claims, 22 Drawing Sheets

(51) Int. Cl.
*H02M 7/5387* (2007.01)
*B60L 53/122* (2019.01)

(58) Field of Classification Search
USPC .......................................................... 320/108
See application file for complete search history.

(56) References Cited

U.S. PATENT DOCUMENTS

| | | | |
|---|---|---|---|
| 2003/0107354 A1* | 6/2003 | Lin .......................... | G05F 1/70 323/222 |
| 2003/0168997 A1* | 9/2003 | Nishimoto ......... | H05B 41/2985 315/291 |
| 2006/0152085 A1* | 7/2006 | Flett ...................... | H02M 7/487 307/75 |
| 2010/0097031 A1* | 4/2010 | King ....................... | B60L 53/22 320/109 |
| 2014/0111005 A1* | 4/2014 | Liu .......................... | H02J 9/04 307/20 |
| 2015/0295491 A1* | 10/2015 | Lenz ....................... | H02M 7/48 323/234 |
| 2017/0099008 A1* | 4/2017 | Keister ................... | H02M 7/49 |
| 2017/0222484 A1* | 8/2017 | DeBaun .................. | H03H 7/40 |
| 2018/0194236 A1* | 7/2018 | Elshaer ............... | H02J 7/00034 |
| 2019/0081516 A1 | 3/2019 | Shahsavari et al. | |

FOREIGN PATENT DOCUMENTS

| | | |
|---|---|---|
| CN | 106452080 A | 2/2017 |
| CN | 106560974 A | 4/2017 |
| CN | 109327065 A | 2/2019 |
| DE | 102017101033 A1 | 8/2017 |
| WO | 2012125590 A2 | 9/2012 |
| WO | 2017136491 A1 | 8/2017 |

OTHER PUBLICATIONS

Extended European Search Report issued in European Application No. 19921861.1 dated Jul. 12, 2021, 7 pages.
Office Action issued in Indian Application No. 202147000279 dated Aug. 10, 2021, 6 pages.

* cited by examiner

WIRELESS CHARGING TRANSMITTING APPARATUS, TRANSMITTING METHOD, AND WIRELESS CHARGING SYSTEM

CROSS-REFERENCE TO RELATED APPLICATIONS

This application is a continuation of International Patent Application No. PCT/CN2019/079864, filed on Mar. 27, 2019, the disclosure of which is hereby incorporated by reference in its entirety.

TECHNICAL FIELD

The present disclosure relates to the field of power electronics technologies, and in particular, to a wireless charging transmitting apparatus, a transmitting method, and a wireless charging system.

BACKGROUND

With aggravation of an energy shortage and environmental pollution in the modern society, as new energy vehicles, electric vehicles have received widespread attention. An electric vehicle drives by using a vehicle-mounted power battery pack as energy. However, limited by capacities of power battery packs, driving mileage of most existing electric vehicles is relatively short. In addition, a charging time of the power battery pack of the electric vehicle is relatively long, and there are a relatively small quantity of charging stations. Therefore, the electric vehicles have not been widely applied and popularized.

Currently, charging modes of an electric vehicle include contact charging and wireless charging. Because of being easy to use, no spark, and no electric shock hazard, wireless charging becomes a development direction of electric vehicles in the future.

The following describes a working principle of a wireless charging system with reference to FIG. 1.

FIG. 1 is a schematic diagram of a wireless charging system.

The wireless charging system includes a wireless transmitting apparatus and a wireless receiving apparatus.

The wireless transmitting apparatus is located at a transmit end, and the wireless receiving apparatus is located at a receive end.

The transmit end includes a DC-to-AC inverter H1, a transmit-end LCL compensation circuit 100, and a transmitting coil Ct.

The DC-to-AC inverter H1 includes controllable switching transistors S1 to S4, and the DC-to-AC inverter H1 is configured to invert a direct current output by a direct current power supply to an alternating current.

The transmitting coil Ct is configured to transmit, in an alternating current magnetic field, the alternating current output by the DC-to-AC inverter H1.

The receive end includes a receiving coil Cr, a receive-end compensation circuit 200, and a rectifier H2.

The rectifier H2 includes controllable switching transistors Q1 to Q4.

The receiving coil Cr is configured to receive, in an alternating current magnetic field, electromagnetic energy emitted by the transmitting coil Ct.

The rectifier H2 is configured to rectify an alternating current output by the receiving coil Cr into a direct current and output the direct current to a load.

A controller 300 at the receive end wirelessly communicates with a controller 400 at the transmit end.

Currently, to improve wireless charging efficiency, it is expected that a controllable switching transistor in H1 implements zero voltage switching (ZVS), to reduce power consumed during working of the controllable switching transistor. Specifically, an input voltage of H1 may be adjusted, so that H1 implements ZVS in all working conditions. However, to adjust the input voltage of H1, an additional direct current conversion circuit needs to be added at an input end of H1. This increases a size and costs of the wireless transmitting apparatus. Although an output voltage of H1 can also be adjusted by adjusting a phase shift of H1, it cannot be ensured that all the controllable switching transistors of H1 can implement ZVS under various output voltages. Once a controllable switching transistor loses ZVS, a relatively large switching loss of H1 is caused, or even H1 is damaged.

SUMMARY

This application provides a wireless charging transmitting apparatus. A DC-to-AC inverter circuit of the wireless charging transmitting apparatus can implement ZVS under different phase shift angles or under different currents at a turn-off moment of a controllable switching transistor of a lagging bridge arm, thereby reducing a switching loss, and improving wireless charging efficiency. In addition, this application further provides a transmission method applied to the wireless charging transmitting apparatus, and a wireless charging system.

According to a first aspect, this application provides a wireless charging transmitting apparatus, including: a DC-to-AC inverter circuit, a transmitting coil, an impedance adjustment circuit, a controller, and a compensation circuit. The DC-to-AC inverter circuit inverts a direct current output by a direct current power supply to an alternating current, the DC-to-AC inverter circuit includes an advancing bridge arm and a lagging bridge arm, and in one period, a voltage phase of the advancing bridge arm precedes a voltage phase of the lagging bridge arm. The compensation circuit compensates the alternating current output by the DC-to-AC inverter circuit and sends the alternating current obtained after the compensation to the transmitting coil. The transmitting coil is configured to: receive the alternating current and generate an alternating current magnetic field. The impedance adjustment circuit includes at least one inductive branch. In other words, there may be one or more inductive branches. Each inductive branch includes an inductor and a switch that are connected in series, all inductive branches are connected in parallel to form an adjustment branch, two ends of the adjustment branch are respectively connected to an output port of the direct current power supply and a midpoint of the lagging bridge arm. The controller changes a current flowing out of the lagging bridge arm by controlling an on/off state of the switch in the inductive branch, so that the controllable switching transistor of the lagging bridge arm implements ZVS.

In this application, an inductive branch is added, and the controller can control on/off of a switch in each inductive branch to adjust the impedance adjustment circuit to present different inductances, to change a magnitude of an inductive current injected into the lagging bridge arm. In this way, the controllable switching transistor of the lagging bridge arm implements ZVS. The controller may control the inductive branch to be connected or disconnected, to be specific, control, according to a requirement during actual operating of the DC-to-AC inverter circuit, whether the inductive branch is to be connected. In some working conditions, the lagging bridge arm of the DC-to-AC inverter circuit can implement ZVS, and therefore, no inductive branch needs to be connected. In this case, the controller can control all the inductive branches to be disconnected, to avoid extra power consumption caused by connecting to the inductive branches. Therefore, this manner is flexible in control. ZVS can be implemented when the inductive branch needs to be connected. When the lagging bridge arm does not need to connect to the inductive branch, the inductive branch is controlled to be disconnected, to reduce power consumption. In addition, a process in which the controller switches the inductive branch does not affect power transmission of the wireless charging transmitting apparatus, and stability and reliability of the wireless charging transmitting apparatus are improved.

With reference to the first aspect, in a first possible implementation, the controller controls on or off of the switch in the inductive branch based on a present phase shift angle and a present output power of the DC-to-AC inverter circuit, where the phase shift angle is a phase difference between a midpoint voltage of the advancing bridge arm and a midpoint voltage of the lagging bridge arm.

With reference to the first aspect and any one of the foregoing possible implementations, in a second possible implementation, the controller searches, based on the output power, for a correspondence between the phase shift angle and a current flowing out of the lagging bridge arm at a turn-off moment of the controllable switching transistor of the lagging bridge arm, where different output powers correspond to different correspondences; and obtains, based on the found correspondence, a phase shift angle interval to which the present phase shift angle of the DC-to-AC inverter circuit belongs, and controls, based on the phase shift angle interval, on or off of the switch in the inductive branch, where different phase shift angle intervals correspond to different quantities of connected inductive branches.

Correspondences that are between phase shift angles and currents flowing out of the lagging bridge arm and that correspond to different output powers may be obtained in advance through simulation, and are stored in the controller. During actual operating, the controller may search for the corresponding correspondence in real time based on the present output power, and determine, based on the found correspondence, the interval to which the present phase shift angle belongs. Because different intervals correspond to different quantities of closed inductive branches, a corresponding quantity of inductive branches may be controlled to be closed based on the interval to which the present phase shift angle belongs. Because the correspondence between the phase shift angle and the current flowing out of the lagging bridge arm has been obtained through pre-simulation, in an actual operating process, an amount of work of the controller can be reduced, and the controller can directly perform searching without calculation. A response speed is fast, and operating performance of the controller is improved.

With reference to the first aspect and any one of the foregoing possible implementations, in a third possible implementation, the controller may control on or off of the switch in the inductive branch based on a current flowing into the compensation circuit at a turn-off moment of the controllable switching transistor of the lagging bridge arm, or may control on or off of the switch in the inductive branch based on a current flowing out of the lagging bridge arm. The following provides descriptions separately.

With reference to the first aspect and any one of the foregoing possible implementations, in a fourth possible implementation, the controller obtains a difference between the current flowing into the compensation circuit at the turn-off moment of the controllable switching transistor of the lagging bridge arm and a preset current, and controls on or off of the switch in the inductive branch based on the difference, where different differences correspond to different quantities of closed inductive branches.

When a closed inductive branch exists, a current flowing into the compensation circuit may be directly measured, a difference between the current flowing into the compensation circuit and the preset current is calculated, and connectivity of the inductive branch is controlled based on the difference.

With reference to the first aspect and any one of the foregoing possible implementations, in a fifth possible implementation, the controller may obtain a current flowing into the compensation circuit, based on the current flowing out of the lagging bridge arm at the turn-off moment of the controllable switching transistor of the lagging bridge arm and a present quantity of closed inductive branches, then obtain a difference between the current flowing into the compensation circuit and a preset current, and control on and off of the switch in the inductive branch based on the difference, where different differences correspond to different quantities of closed inductive branches.

Compared with the case in which connection or disconnection of the inductive branch is controlled based on the phase shift angle and the output power, in the foregoing described case in which the inductive branch is controlled based directly on the current, a pre-simulation process is omitted, and current detection is performed directly by using a current detection circuit, to avoid component tolerance differences of different products.

With reference to the first aspect and any one of the foregoing possible implementations, in a sixth possible implementation, the first end of the adjustment branch is connected to a positive direct current bus, a negative direct current bus, or a direct current bus midpoint at an output end of the direct current power supply. Different modes for connecting the first end of the adjustment branch to the direct current power supply may be set according to an actual condition of the direct current power supply.

With reference to the first aspect and any one of the foregoing possible implementations, in a seventh possible implementation, the impedance adjustment circuit further includes a first DC blocking capacitor, and the first end of the adjustment branch is connected to the direct current bus midpoint by using the first DC blocking capacitor. The first DC blocking capacitor can filter out a direct current component in the adjustment branch, reduce an increment of an rms current in the lagging bridge arm, and reduce a conduction loss and a switching loss of the controllable switching transistor of the lagging bridge arm.

With reference to the first aspect and any one of the foregoing possible implementations, in an eighth possible implementation, the impedance adjustment circuit further includes a second DC blocking capacitor, and the first end of the adjustment branch is connected to the positive direct current bus by using the second DC blocking capacitor. The second DC blocking capacitor can filter out a direct current component in the adjustment branch, reduce an increment of an rms current in the lagging bridge arm, and reduce a conduction loss and a switching loss of the controllable switching transistor of the lagging bridge arm.

With reference to the first aspect and any one of the foregoing possible implementations, in a ninth possible implementation, the impedance adjustment circuit further includes a third DC blocking capacitor, and the first end of the adjustment branch is connected to the negative direct current bus by using the third DC blocking capacitor. The third DC blocking capacitor can filter out a direct current component in the adjustment branch, reduce an increment of an rms current in the lagging bridge arm, and reduce a conduction loss and a switching loss of the controllable switching transistor of the lagging bridge arm.

With reference to the first aspect and any one of the foregoing possible implementations, in a tenth possible implementation, the at least one inductive branch includes a first diode and a second diode; an anode of the first diode is connected to a common end of the inductor and the switch in the inductive branch, and a cathode of the first diode is connected to the positive direct current bus; and a cathode of the second diode is connected to the common end of the inductor and the switch in the inductive branch, and an anode of the second diode is connected to the negative direct current bus.

Two diodes are used to form a diode clamp circuit. When a switch in an inductive branch having a diode clamp circuit is turned off, a freewheeling path can be provided for an inductor in the inductive branch, and a voltage at a common end of an inductor and a switch in the inductive branch can be stabilized within a safety range. A circuit protecting function is provided.

With reference to the first aspect and any one of the foregoing possible implementations, in a tenth possible implementation, the impedance adjustment circuit includes at least two inductive branches; the two inductive branches are a first inductive branch and a second inductive branch; the first inductive branch includes a first inductor and a first switch, a first end of the first inductor is connected to the output port of the direct current power supply, and a second end of the first inductor is connected to the midpoint of the lagging bridge arm by using the first switch; and the second inductive branch includes a second inductor and a second switch, a first end of the second inductor is connected to the output port of the direct current power supply, and a second end of the second inductor is connected to the midpoint of the lagging bridge arm by using the second switch.

When the impedance adjustment circuit includes at least two inductive branches, the controller may adjust connection or disconnection of a plurality of inductive branches, so that matching between the inductive current injected by the impedance adjustment circuit for the lagging bridge arm and the phase shift angle is more accurate.

According to a second aspect, this application provides a wireless charging control method. The method is applied to wireless charging transmitting apparatus. The wireless charging transmitting apparatus includes a DC-to-AC inverter circuit, a transmitting coil, an impedance adjustment circuit, and a controller. The DC-to-AC inverter circuit is configured to invert a direct current output by a direct current power supply to an alternating current, the DC-to-AC inverter circuit includes an advancing bridge arm and a lagging bridge arm, and in one period, a voltage phase of the advancing bridge arm precedes a voltage phase of the lagging bridge arm. The transmitting coil is configured to: receive the alternating current and generate an alternating current magnetic field. The impedance adjustment circuit includes at least one inductive branch, where each inductive branch includes an inductor and a switch that are connected in series, all inductive branches are connected in parallel to form an adjustment branch, a first end of the adjustment branch is connected to an output port of the direct current power supply, and a second end of the adjustment branch is connected to a midpoint of the lagging bridge arm. The method includes: controlling on or off of the switch in the inductive branch to change a current flowing out of the lagging bridge arm, so that a controllable switching transistor of the lagging bridge arm implements zero-voltage switching.

In this application, an inductive branch is added, and the controller can control on/off of a switch in each inductive branch to adjust the impedance adjustment circuit to present different inductances, to change a magnitude of an inductive current injected into the lagging bridge arm. In this way, the controllable switching transistor of the lagging bridge arm implements ZVS. The controller may control the inductive branch to be connected or disconnected, to be specific, control, according to a requirement during actual operating of the DC-to-AC inverter circuit, whether the inductive branch is to be connected. In some working conditions, the lagging bridge arm of the DC-to-AC inverter circuit can implement ZVS, and therefore, no inductive branch needs to be connected. In this case, the controller can control all the inductive branches to be disconnected, to avoid extra power consumption caused by connecting to the inductive branches. Therefore, this manner is flexible in control. ZVS can be implemented when the inductive branch needs to be connected. When the lagging bridge arm does not need to connect to the inductive branch, the inductive branch is controlled to be disconnected, to reduce power consumption. In addition, a process in which the controller switches the inductive branch does not affect power transmission of the wireless charging transmitting apparatus, and stability and reliability of the wireless charging transmitting apparatus are improved.

With reference to the second aspect, in a first possible implementation, the controlling on or off of the switch in the inductive branch to change a current flowing out of the lagging bridge arm is specifically: controlling on or off of the switch in the inductive branch based on a present phase shift angle and a present output power of the DC-to-AC inverter circuit, where the phase shift angle is a phase difference between a midpoint voltage of the advancing bridge arm and a midpoint voltage of the lagging bridge arm.

With reference to the second aspect and any one of the foregoing possible implementations, in a second possible implementation, the controlling on or off of the switch in the inductive branch based on a present phase shift angle and a present output power of the DC-to-AC inverter circuit is specifically: searching, based on the output power, for a correspondence between the phase shift angle and a current flowing out of the lagging bridge arm at a turn-off moment of the controllable switching transistor of the lagging bridge arm, where different output powers correspond to different correspondences; and obtaining, based on the found correspondence, a phase shift angle interval to which the present phase shift angle of the DC-to-AC inverter circuit belongs, and controlling, based on the phase shift angle interval, on or off of the switch in the inductive branch, where different phase shift angle intervals correspond to different quantities of connected inductive branches.

Correspondences that are between phase shift angles and currents flowing out of the lagging bridge arm and that correspond to different output powers may be obtained in advance through simulation, and are stored in the controller. During actual operating, the controller may search for the corresponding correspondence in real time based on the present output power, and determine, based on the found correspondence, the interval to which the present phase shift angle belongs. Because different intervals correspond to different quantities of closed inductive branches, a corresponding quantity of inductive branches may be controlled to be closed based on the interval to which the present phase shift angle belongs. Because the correspondence between the phase shift angle and the current flowing out of the lagging bridge arm has been obtained through pre-simulation, in an actual operating process, an amount of work of the controller can be reduced, and the controller can directly perform searching without calculation. A response speed is fast, and operating performance of the controller is improved.

With reference to the second aspect and any one of the foregoing possible implementations, in a third possible implementation, the controlling on or off of the switch in the inductive branch to change a current flowing out of the lagging bridge arm is specifically; controlling on or off of the switch in the inductive branch based on a current flowing into the compensation circuit or a current flowing out of the lagging bridge arm at a turn-off moment of the controllable switching transistor of the lagging bridge arm.

When a closed inductive branch exists, a current flowing into the compensation circuit may be directly measured, a difference between the current flowing into the compensation circuit and the preset current is calculated, and connectivity of the inductive branch is controlled based on the difference.

With reference to the second aspect and any one of the foregoing possible implementations, in a fourth possible implementation, the controlling on or off of the switch in the inductive branch based on a current flowing into the compensation circuit at a turn-off moment of the controllable switching transistor of the lagging bridge arm is specifically: obtaining a difference between the current flowing into the compensation circuit at the turn-off moment of the controllable switching transistor of the lagging bridge arm and a preset current, and controlling on and off of the switch in the inductive branch based on the difference, where different differences correspond to different quantities of closed inductive branches.

With reference to the second aspect and any one of the foregoing possible implementations, in a fifth possible implementation, the controlling on or off of the switch in the inductive branch based on a current flowing out of the lagging bridge arm is specifically: obtaining a current flowing into the compensation circuit, based on the current flowing out of the lagging bridge arm at the turn-off moment of the controllable switching transistor of the lagging bridge arm and a present quantity of closed inductive branches, obtaining a difference between the current flowing into the compensation circuit and a preset current, and controlling on and off of the switch in the inductive branch based on the difference, where different differences correspond to different quantities of closed inductive branches.

Compared with the case in which connection or disconnection of the inductive branch is controlled based on the phase shift angle and the output power, in the foregoing described case in which the inductive branch is controlled based directly on the current, a pre-simulation process is omitted, and current detection is performed directly by using a current detection circuit, accuracy being more consistent with that of the actual product.

According to a third aspect, this application provides a wireless charging system, including a wireless charging receiving apparatus and the foregoing wireless charging transmitting apparatus. The wireless charging receiving apparatus is configured to: receive an alternating current magnetic field transmitted by the wireless charging transmitting apparatus, convert the alternating current magnetic field into a direct current, and provide the direct current for a current-using device.

Because the wireless charging system includes the wireless charging transmitting apparatus described above, a switching loss of the wireless charging transmitting apparatus is reduced, wireless charging efficiency is improved, and stability and reliability of the wireless charging transmitting apparatus are improved.

According to a fourth aspect, this application provides a current-using device, including a power-intensive element, a battery, and a wireless charging receiving apparatus. The wireless charging receiving apparatus is configured to receive an alternating current magnetic field transmitted by the wireless charging transmitting apparatus. The wireless charging receiving apparatus is configured to: convert the alternating current into a direct current to charge the battery. The battery is configured to supply power to the power-intensive element. The current-using device may be an electric vehicle. The wireless charging receiving apparatus may be located in the electric vehicle, and the wireless charging transmitting apparatus may be located on the ground.

Because the current-using device may be charged by using the wireless charging transmitting apparatus described above, power transmission is not interrupted when the wireless charging transmitting apparatus adjusts a phase shift angle, and the current-using device has relatively good stability and safety in a wireless charging process.

Compared with the Prior Art, the Present Invention has at Least the Following Advantages:

The wireless charging transmitting apparatus additionally includes the impedance adjustment circuit and the controller. The impedance adjustment circuit includes at least one inductive branch, each inductive branch includes an inductor and a switch that are connected in series, all inductive branches are connected in parallel to form the adjustment branch, the first end of the adjustment branch is connected to the output port of the direct current power supply, and the second end of the adjustment branch is connected to the midpoint of the lagging bridge arm. An inductive current may be injected into the lagging bridge arm as required, to increase an inductive current component in the lagging bridge arm. The controller controls on or off of the switch in the inductive branch to change a current flowing out of the lagging bridge arm, so that a controllable switching transistor of the lagging bridge arm implements ZVS. Current in the lagging bridge arm needs to be controlled because ZVS needs to be implemented by controlling the controllable switching transistor of the lagging bridge arm. In this application, there may be one or more inductive branches. In this application, when an inductive current needs to be injected into the lagging bridge arm, a corresponding quantity of inductive branches are controlled to connect to the lagging bridge arm, to change the current flowing out of the lagging bridge arm, namely, the current in the lagging bridge arm. When the adjustment branch includes one inductive branch, the controller may control whether the inductive branch is to be connected to the midpoint of the lagging bridge arm, to be specific, control the inductive branch to connect to the midpoint of the lagging bridge arm when a switch in the inductive branch is closed. Then, an inductive current is injected into the lagging bridge arm. When the adjustment branch includes a plurality of inductive branches connected in parallel, the controller may control on/off of a switch in each inductive branch to adjust a magnitude of an inductance presented by the impedance adjustment circuit. Different magnitudes of an inductance in the impedance adjustment circuit indicate different inductive currents injected into the lagging bridge arm. The controller may control, by controlling a quantity of connected inductive branches, a current injected into the lagging bridge arm, to avoid an increase in power consumption caused by an excessive quantity of connected inductors. In this way, power consumption caused by an inductive branch can be reduced, and wireless charging efficiency is improved. In addition, in a process in which the controller switches the inductive branch, power transmission of the wireless charging transmitting apparatus does not need to be interrupted, and stability and reliability of power transmission of the wireless charging transmitting apparatus are improved.

BRIEF DESCRIPTION OF DRAWINGS

To describe the technical solutions in the embodiments of this application or in the prior art more clearly, the following briefly describes the accompanying drawings required for describing the embodiments or the prior art. Apparently, the accompanying drawings in the following descriptions show merely some embodiments of this application, and a person of ordinary skill in the art may still derive other drawings from these accompanying drawings without creative efforts.

FIG. 2b is a schematic structural diagram of the wireless electric-vehicle charging system provided in FIG. 2a;

FIG. 5b is a graph showing a relationship curve that is of a current $I_1$ in a lagging bridge arm and a phase shift angle and that corresponds to FIG. 5a;

DESCRIPTION OF EMBODIMENTS

To make a person skilled in the art better understand the technical solutions provided in embodiments of this application, the following first describes an application scenario of a wireless charging transmitting apparatus.

Figure 1:
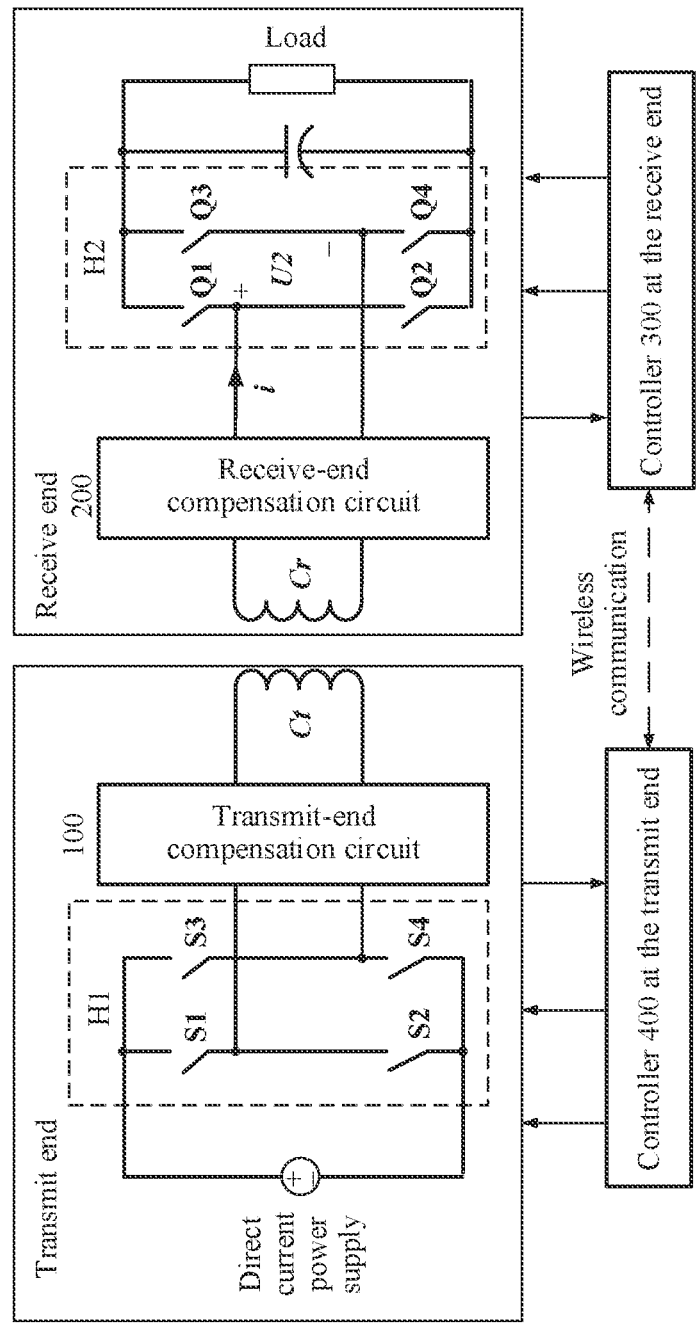
FIG. 1 is a schematic diagram of a wireless charging system according to the prior art.
Figure 2A:
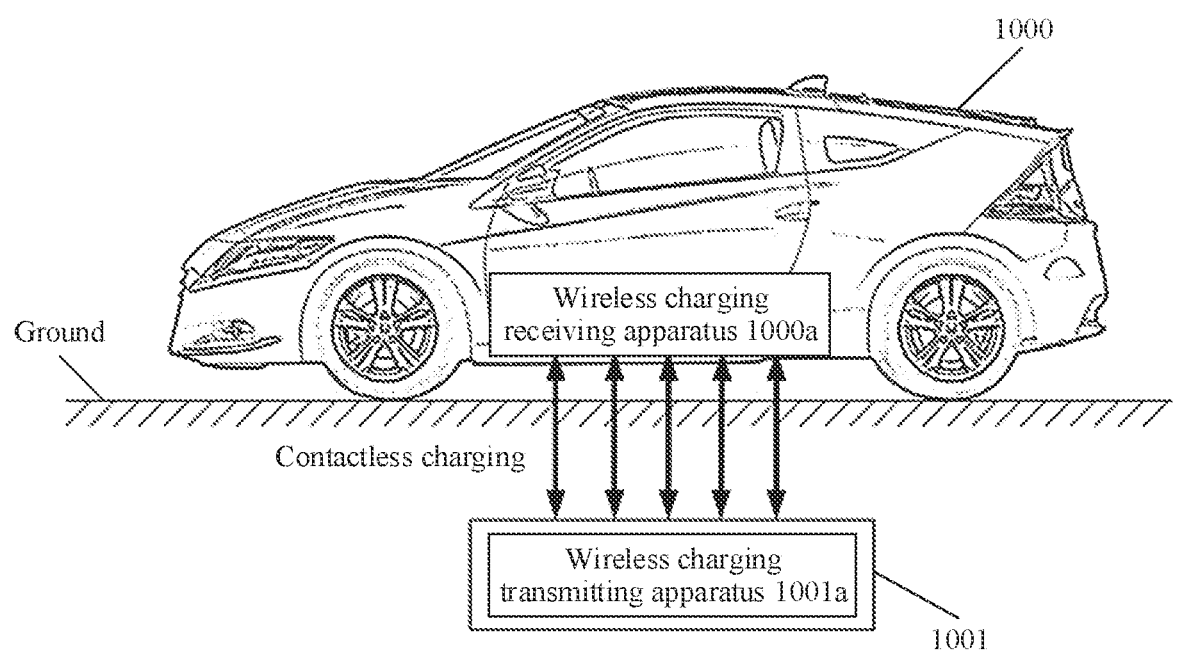
FIG. 2a is a schematic diagram of a wireless electric-vehicle charging system according to an embodiment of this application.

FIG. 2a is a schematic diagram of a wireless electric-vehicle charging system according to an embodiment of this application.

The wireless charging system may include at least an electric vehicle 1000 and a wireless charging station 1001. The electric vehicle 1000 may include a wireless charging receiving apparatus 1000a, and the wireless charging station 1001 may include a wireless charging transmitting apparatus 1001a.

Currently, in a charging process of the wireless charging system, contactless charging is performed jointly by using the wireless charging receiving apparatus 1000a located in the electric vehicle 1000 and the wireless charging transmitting apparatus 1001a located in the wireless charging station 1001.

The wireless charging station 1001 may be specifically a fixed wireless charging station, a fixed wireless charging parking space, a wireless charging road, or the like. The wireless charging transmitting apparatus 100a may be disposed on the ground or buried under the ground (where FIG.

2a shows a case in which the wireless charging transmitting apparatus 1001a is buried under the ground), and may wirelessly charge the electric vehicle 1000 located above the wireless charging transmitting apparatus 1001a.

The wireless charging receiving apparatus 1000a may be integrated into the bottom of the electric vehicle 1000. When the electric vehicle 1000 enters a wireless charging range of the wireless charging transmitting apparatus 1001a, the electric vehicle 1000 may be charged in a wireless charging manner. A power receive antenna and a rectifier circuit of the wireless charging receiving apparatus 1000a may be integrated together or separated. When the power receive antenna is separated from the rectifier circuit, a rectifier of the rectifier circuit is usually placed in the vehicle.

A power transmit antenna and a DC-to-AC inverter of the wireless charging transmitting apparatus 1001a may be integrated together or separated. In addition, during the contactless charging, the wireless charging receiving apparatus 1000a and the wireless charging transmitting apparatus 1001a may perform wireless energy transmission through electric field coupling or magnetic field coupling. The coupling may be specifically electric field induction, magnetic induction, magnetic resonance, or wireless radiation, and is not specifically limited in this embodiment of this application. Further, the electric vehicle 1000 and the wireless charging station 1001 may perform bidirectional charging. In other words, the wireless charging station 1001 may charge the electric vehicle 1000 by using a power supply, or the electric vehicle 1000 may discharge to a power supply.

Figure 2B:
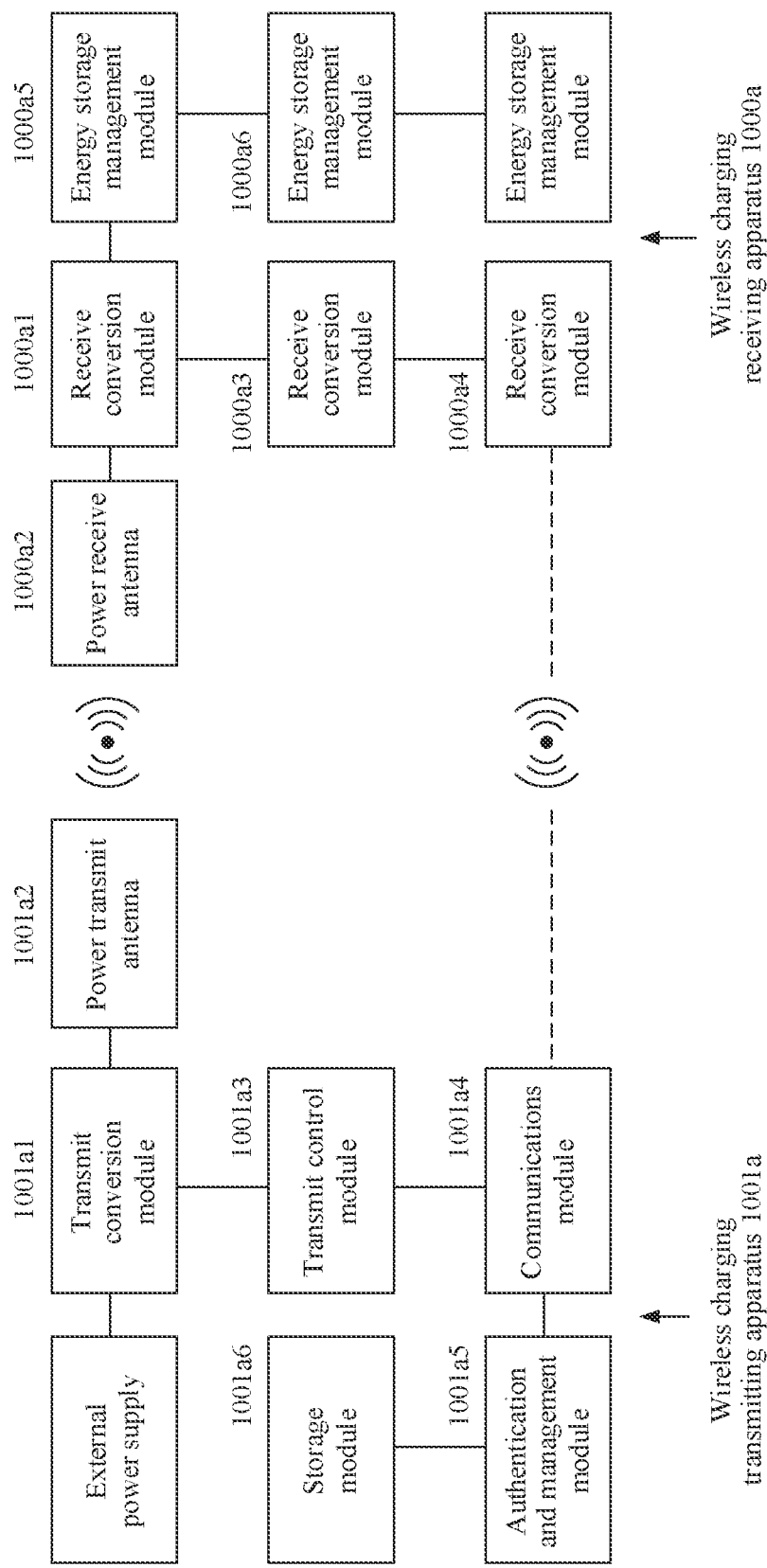

FIG. 2b is a schematic structural diagram of the wireless electric-vehicle charging system provided in FIG. 2a.

The wireless charging transmitting apparatus 1001a shown in FIG. 2b includes a transmit conversion module 1001a1, a power transmit antenna 1001a2, a transmit control module 1001a3, a communications module 1001a4, an authentication and management module 100a5, and a storage module 1001a6.

The wireless charging receiving apparatus 1000a includes a power receive antenna 1000a2, a receive control module 1000a3, a receive conversion module 1000a1, a vehicle communications module 1000a4, an energy storage management module 1000a5, and an energy storage module 1000a6. In addition, the receive conversion module 1000a1 may be connected to the energy storage module 1000a6 by using the energy storage management module 1000a5, and use received energy to charge the energy storage module 1000a6, to drive the electric vehicle. It should be noted that the energy storage management module 1000a5 and the energy storage module 1000a6 may be disposed inside or outside the wireless charging receiving apparatus 1000a. This is not specifically limited in this embodiment of the present invention.

The transmit conversion module 1001a1 may be connected to an external power supply, and convert an alternating current or a direct current obtained from the external power supply into a high-frequency alternating current. When an input of the external power supply is an alternating current, the transmit conversion module 1001a1 includes at least a power factor correction unit and a DC-to-AC inverter. When the input of the external power supply is a direct current, the transmit conversion module 1001a1 includes at least a DC-to-AC inverter. The power factor correction unit is configured to keep a phase of an input current of the wireless charging system consistent with a phase of a power grid voltage, to reduce harmonic content of the wireless charging system, increase a power factor value, reduce pollution of the wireless charging system to a power grid, and improve reliability. The power factor correction unit may be further configured to increase or decrease an output voltage of the power factor correction unit according to a requirement of a lower-level device. The DC-to-AC inverter is configured to convert the voltage that is output by the power factor correction unit into a high-frequency alternating-current voltage, and apply the high-frequency alternating-current voltage to the power transmit antenna 1001a2. The high-frequency alternating-current voltage can be used to improve transmission efficiency and increase a transmission distance. In FIG. 2b, that the wireless charging transmitting apparatus 1001a is connected to an external power supply is used as an example. It may be understood that the power supply may alternatively be a power supply located inside the wireless charging transmitting apparatus 1001a.

The power transmit antenna 1001a2 is configured to transmit, in an alternating current magnetic field, the alternating current output by the transmit conversion module 1001a1.

The transmit control module 1001a3 may control voltage, current, and frequency conversion parameter adjustment of the transmit conversion module 1001a1 according to an actual transmit power requirement for wireless charging, to control voltage or current output adjustment of a high-frequency alternating current in the power transmit antenna 1001a2.

The communications module 1001a4 and the vehicle communications module 1000a4 are configured to implement wireless communication between the wireless charging transmitting apparatus 1001a and the wireless charging receiving apparatus 1000a, where communicated content includes power control information, fault protection information, power-on/off information, mutual authentication information, and the like. The wireless charging transmitting apparatus 1001a may receive attribute information of the electric vehicle, a charging request, and mutual authentication information that are sent by the wireless charging receiving apparatus 1000a. In addition, the wireless charging transmitting apparatus 1001a may further send wireless charging transmitting control information, mutual authentication information, historical wireless charging data information, and the like to the wireless charging receiving apparatus 1000a. Specifically, manners of the foregoing wireless communication may include, but not limited to, any one or any combination of Bluetooth, wireless fidelity (Wi-Fi), a ZigBee protocol, a radio frequency identification (RFD) technology, a long range (Lora) wireless technology, and a near field communication (NFC) technology. Further, the communications module 1001a4 may further communicate with an intelligent terminal of a user owning the electric vehicle, and the user implements remote authentication and user information transmission by using a communication function.

The authentication and management module 1001a5 is used for mutual authentication and permission management between the wireless charging transmitting apparatus 1001a and the electric vehicle in the wireless charging system.

The storage module 1001a6 is configured to store charging process data, mutual authentication data (for example, the mutual authentication information), and permission management data (for example, permission management information) of the wireless charging transmitting apparatus 1001a. The mutual authentication data and the permission management data may be factory settings or may be set by a user. This is not specifically limited in this embodiment of this application.

The power receive antenna 1000a2 is configured to receive, in an alternating current magnetic field, electromagnetic energy emitted by the power transmit antenna 1001a2. Structure combination forms of compensation circuits of the power transmit antenna 1001a2 and the power receive antenna 1000a2 in the wireless charging system include an S-S type, a P-P type, an S-P type, a P-S type, an LCL-LCL type, an LCL-P type, and the like. This is not specifically limited in this embodiment of this application. In addition, to implement a bidirectional charging function of the wireless charging system, the wireless charging transmitting apparatus 1001a and the wireless charging receiving apparatus 100a in the wireless charging system may respectively include a power receive antenna and a power transmit antenna, where the power receive antenna and the power transmit antenna may be specifically independent of each other or integrated together.

The receive conversion module 1000a1 is configured to convert the electromagnetic energy received by the power receive antenna 1000a2 into a DC voltage and a DC current that are required for charging the energy storage module 1000a6. The receive conversion module 1000a1 includes at least a compensation circuit and a rectifier, where the rectifier converts a high-frequency resonance current and a high-frequency resonance voltage that are received by the power receive antenna into a DC voltage and a DC current.

The receive control module 1000a3 is configured to control voltage, current, and frequency conversion parameter adjustment of the receive conversion module 1000a1 according to an actual wireless charging receive-power requirement.

The DC-to-AC inverter of the wireless charging transmitting apparatus 1001a includes a DC-to-AC inverter circuit and a compensation circuit, where the DC-to-AC inverter circuit is configured to invert a direct current output by a direct current power supply to an alternating current. Currently, to improve wireless charging efficiency, it is expected that a controllable switching transistor in the DC-to-AC inverter circuit of the wireless charging transmitting apparatus implements ZVS, to reduce power consumed during working of the controllable switching transistor. Specifically, an input voltage of the DC-to-AC inverter may be adjusted, and a phase shift angle remains unchanged, so that the DC-to-AC inverter implements ZVS in all working conditions. However, to adjust the input voltage of the DC-to-AC inverter, an additional direct current conversion circuit needs to be added at an input end of the DC-to-AC inverter. This increases a size and costs of the wireless transmitting apparatus. In addition, an output voltage of the DC-to-AC inverter can be adjusted by adjusting a phase shift of the DC-to-AC inverter. For an advancing bridge arm, the DC-to-AC inverter can implement zero-voltage switching in an adjustment process, but for a lagging bridge arm, it cannot be ensured that the DC-to-AC inverter can implement zero voltage switching under various output voltages (different phase shift angles). Once the controllable switching transistor loses zero voltage switching, a switching loss of the DC-to-AC inverter is relatively large, or even the DC-to-AC inverter is damaged.

To resolve the foregoing problem in the prior art, this application provides a wireless charging transmitting apparatus. The apparatus additionally includes the impedance adjustment circuit and the controller. The impedance adjustment circuit includes at least one inductive branch, each inductive branch includes an inductor and a switch that are connected in series, all inductive branches are connected in parallel to form the adjustment branch, the first end of the adjustment branch is connected to the output port of the direct current power supply, and the second end of the adjustment branch is connected to the midpoint of the lagging bridge arm. An inductive current is injected into the lagging bridge arm by using the adjustment branch, to increase an inductive current component in the lagging bridge arm. The controller is configured to control on or off of the switch in the inductive branch to change a current flowing out of the lagging bridge arm. To be specific, the controller controls a magnitude of a current injected into the lagging bridge arm by controlling a quantity of connected inductive branches, so that a controllable switching transistor of the lagging bridge arm implements zero voltage switching. On the premise that the controllable switching transistor of the lagging bridge arm can implement zero voltage switching, an increase in power consumption caused by an excessive quantity of connected inductors is avoided. In addition, power transmission of the wireless charging transmitting apparatus does not need to be interrupted in a process in which the controller switches the inductive branch, and stability and reliability of the wireless charging transmitting apparatus are improved. In the following descriptions of this application, the controllable switching transistor implements ZVS.

To make a person skilled in the art understand the technical solutions in the present invention better, the following clearly describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present invention.

Apparatus Embodiment 1

Figure 2C:
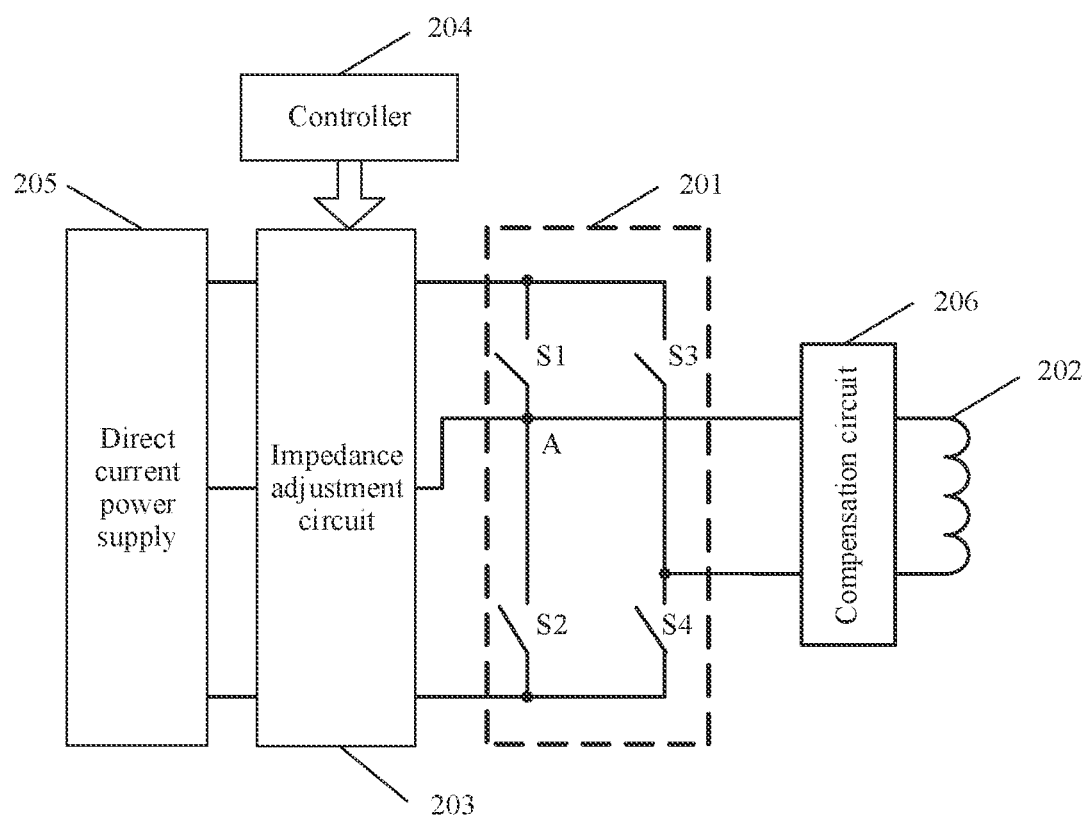
FIG. 2c is a schematic diagram of a wireless charging transmitting apparatus according to Apparatus Embodiment 1 of this application.

FIG. 2c is a schematic diagram of a wireless charging transmitting apparatus according to Apparatus Embodiment 1 of this application.

The wireless charging transmitting apparatus provided in this embodiment of this application is located at a transmit end, and is configured to convert, into an alternating current magnetic field, a direct current input by a direct current power supply, and send the alternating current magnetic field to a wireless charging receiving apparatus. The wireless charging transmitting apparatus may be applied to the electric vehicle field, and is configured to charge an electric vehicle. The wireless charging receiving apparatus may be located on the electric vehicle.

The apparatus includes a DC-to-AC inverter circuit 201, a transmitting coil 202, an impedance adjustment circuit 203, a controller 204, and a compensation circuit 206.

The DC-to-AC inverter circuit 201 inverts the direct current output by the direct current power supply into an alternating current, the DC-to-AC inverter circuit 201 includes an advancing bridge arm and a lagging bridge arm, and in one period, a voltage phase of the advancing bridge arm precedes a voltage phase of the lagging bridge arm.

The compensation circuit 206 compensates the alternating current output by the DC-to-AC inverter circuit 201, and sends the alternating current obtained after the compensation to the transmitting coil 202.

In FIG. 2c, an example in which the DC-to-AC inverter circuit 201 includes controllable switching transistor S1 to S4 is used. A bridge arm including the controllable switching transistors S3 and S4 is the advancing bridge arm, and a bridge arm including the controllable switching transistors S1 and S2 is the lagging bridge arm.

The transmitting coil 202 transmits the alternating current in an alternating current magnetic field.

The impedance adjustment circuit 203 includes at least one inductive branch, each inductive branch includes an inductor and a switch that are connected in series, all inductive branches are connected in parallel to form an adjustment branch, a first end of the adjustment branch is connected to an output port of the direct current power supply 205, and a second end of the adjustment branch is connected to a midpoint of the lagging bridge arm, namely, a point A between the controllable switching transistors S1 and S2 in FIG. 2c. Because the adjustment branch is connected to the midpoint of the lagging bridge arm, an inductive current can be injected into the lagging bridge arm, to increase an inductive current component in the lagging bridge arm.

The controller 204 may control on or off of the switch in the inductive branch to change a current flowing out of the lagging bridge arm, so that the controllable switching transistor of the lagging bridge arm implements ZVS.

It may be understood that the controller provided in this application is equivalent to the transmit control module 1001a3 in FIG. 2b.

To enable the controllable switching transistors S1 and S2 of the lagging bridge arm to implement ZVS, a phase of a current flowing out of the midpoint of the lagging bridge arm needs to lag behind a phase of an output voltage (a voltage difference between the midpoint of the lagging bridge arm and a negative bus of a DC-to-AC inverter) in the lagging bridge arm of the DC-to-AC inverter circuit 201, that is, a load of the output voltage in lagging bridge arm is inductive. When a phase shift angle of the DC-to-AC inverter circuit 201 is adjusted, a phase relationship between the current flowing out of the midpoint of the lagging bridge arm and the voltage in the lagging bridge arm of the DC-to-AC inverter circuit 201 is changed, further changing reactance of the load of the lagging bridge arm. When the lagging bridge arm changes from an inductive circuit to a capacitive circuit, the controllable switching transistors S1 and S2 cannot implement ZVS. In this application, an appropriate inductive current is injected into the lagging bridge arm by using an inductive branch. In this way, the phase of the current in the lagging bridge arm keeps lagging behind the phase of the output voltage in the lagging bridge arm of the DC-to-AC inverter circuit 201.

It may be understood that a quantity of inductive branches included in the adjustment branch may continuously increase, so that a controllable switch of the lagging bridge arm under different phase shift angles can implement ZVS. The controller controls on/off of a switch in each inductive branch, to change a quantity (including 0) of connected inductive branches, and further change a magnitude of an inductive current injected by the adjustment branch into the lagging bridge arm. Further, by properly selecting an inductance of an inductor in each inductive branch, an appropriate current gradient can be established for the inductive current injected into the lagging bridge arm, so that matching between the inductive current injected into the lagging bridge arm and the phase shift angle is more accurate. This avoids an increase in a conduction loss and a switching loss of the controllable switching transistor of the lagging bridge arm that is caused by an excessive increase in the current in the lagging bridge arm when the controllable switch of the lagging bridge arm has implemented ZVS.

When there are a plurality of inductive branches, inductance values of inductors in all inductive branches may be equal or may not be equal. Specifically, the inductance values may be set according to a requirement. This is not specifically limited in this application. In addition, types of switches in all the inductive branches may be the same or may be different. For example, a switch type may be any one of the following: a relay, a circuit breaker, a contactor, an insulated gate bipolar transistor (IGBT), or a metal oxide semiconductor (MOS) field effect transistor.

The wireless charging transmitting apparatus provided in this embodiment of this application additionally includes the impedance adjustment circuit and the controller. The impedance adjustment circuit includes at least one inductive branch, each inductive branch includes an inductor and a switch that are connected in series, all inductive branches are connected in parallel to form the adjustment branch, the first end of the adjustment branch is connected to the output port of the direct current power supply, and the second end of the adjustment branch is connected to the midpoint of the lagging bridge arm. The controller is configured to control on or off of the switch in the inductive branch to change a current flowing out of the lagging bridge arm, that is, the controller controls a quantity of connected inductive branches, to control a magnitude of a current injected into the lagging bridge arm, so that the controllable switching transistor of the lagging bridge arm implements ZVS. The controller controls the inductive branch to connect to the lagging bridge arm only when an inductive current needs to be injected into the lagging bridge arm. When the adjustment branch includes a plurality of inductive branches connected in parallel, the controller may control on/off of a switch in each inductive branch, so that the impedance adjustment circuit presents different inductances. Different magnitudes of an inductance in the impedance adjustment circuit indicate different inductive currents injected into the lagging bridge arm. A process in which the controller switches the inductive branch does not affect power transmission of the wireless charging transmitting apparatus, and stability and reliability of the wireless charging transmitting apparatus are improved.

Apparatus Embodiment 2

The following describes working principles separately by using an example in which an adjustment branch includes one inductive branch and an example in which an adjustment branch includes at least two inductive branches. Regardless of whether the adjustment branch includes one inductive branch or a plurality of inductive branches, a controller may control an inductive branch to be closed or open in the following two manners:

First manner: The controller controls on or off of a switch in the inductive branch based on a present phase shift angle and a present output power of a DC-to-AC inverter circuit.

Second manner: The controller controls on or off of a switch in the inductive branch based on a current flowing into a compensation circuit or a current flowing out of a lagging bridge arm at a turn-off moment of a controllable switching transistor of the lagging bridge arm.

In the second manner, when none of the inductive branches is connected, the current flowing into the compensation circuit is equal to the current flowing out of the lagging bridge arm. However, when an inductive branch is connected, the current flowing into the compensation circuit is not equal to the current flowing out of the lagging bridge arm.

Figure 3A:
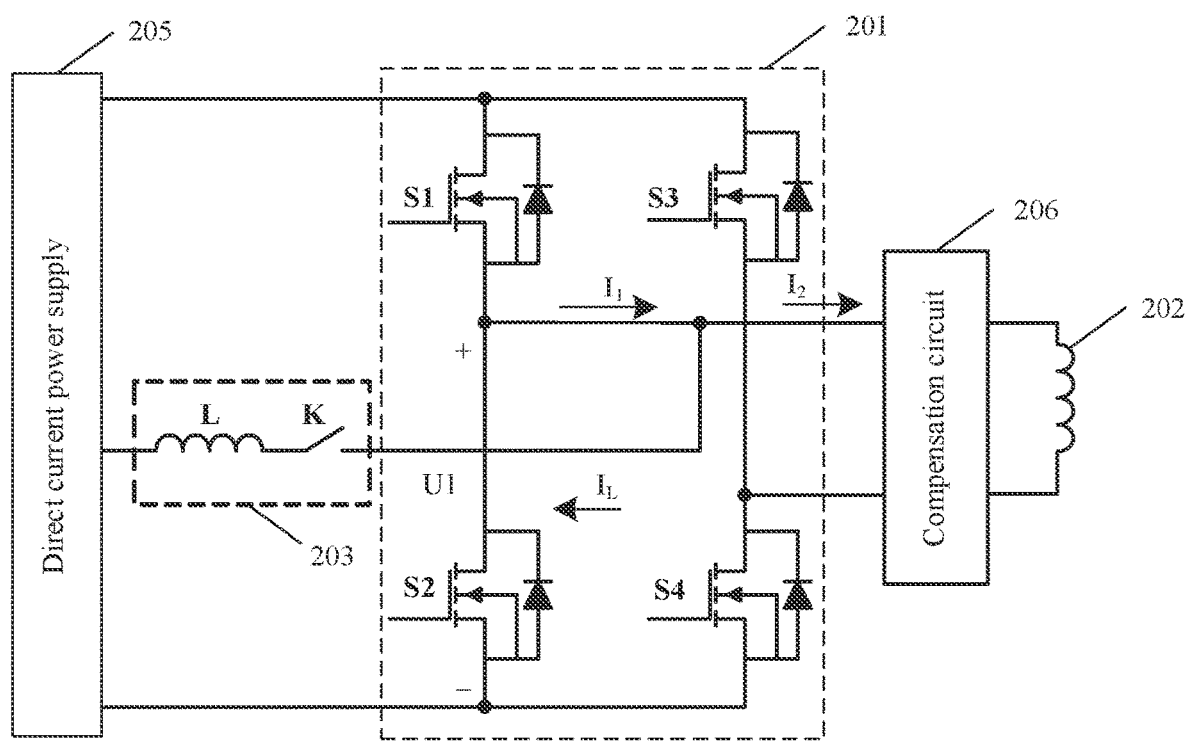
FIG. 3a is a circuit diagram in which an impedance adjustment branch of a wireless charging transmitting apparatus includes one inductive branch.

(1) The Adjustment Branch Includes One Inductive Branch, Refer to FIG. 3a.

First, the first control manner of the controller is described.

The controller controls on or off of a switch in the inductive branch, based on a present phase shift angle and a present output power of a DC-to-AC inverter circuit. Details are as follows:

The controller searches, based on the output power, for a correspondence between the phase shift angle and a current flowing out of a lagging bridge arm at a turn-off moment of a controllable switching transistor of the lagging bridge arm, where different output powers correspond to different correspondences; and obtains, based on the found correspondence, a phase shift angle interval to which the present phase shift angle of the DC-to-AC inverter circuit belongs, and controls, based on the phase shift angle interval, on or off of the switch in the inductive branch, where different phase shift angle intervals correspond to different quantities of connected inductive branches.

When an inductive branch is not connected, a current $I_1$ flowing out of the lagging bridge arm is equal to a current $I_2$ flowing into the compensation circuit. Using a direction in which a current flows out of the lagging bridge arm as a positive direction, correspondences between phase shift angles of the DC-to-AC inverter circuit under different output powers and the current $I_1$ that flows out of the lagging bridge arm at the turn-off moment of the controllable switching transistor of the lagging bridge arm are pre-established. The correspondences are also correspondences between the phase shift angles of the DC-to-AC inverter circuit at the different output powers and the current $I_2$ flowing into the compensation circuit. Different output powers correspond to different correspondences. For ease of description, a turn-off current of the lagging bridge arm is used to represent the current flowing out of the lagging bridge arm at the turn-off moment of the controllable switching transistor of the lagging bridge arm. During specific implementation, the correspondence may be implemented by using a curve or a table. For example, different output powers correspond to different curves. The curve is a two-dimensional curve of the phase shift angle and the turn-off current of the lagging bridge arm. In other words, the two-dimensional curve represents a correspondence between the phase shift angle and the turn-off current of the lagging bridge arm.

FIG. 3a is a circuit diagram an impedance adjustment branch of a wireless charging transmitting apparatus includes one inductive branch.

For descriptions of a DC-to-AC inverter circuit 201, a transmitting coil 202, a direct current power supply 205, and a compensation circuit 206, refer to the foregoing descriptions. Positive directions of a voltage and a current are shown in the figure. Details are not described herein again.

An inductive branch of an impedance adjustment circuit 203 includes an inductor L and a switch K that are connected in series. A first end of the inductor L is connected to an output port of the direct current power supply 205, and a second end of the inductor L is connected to a midpoint of a lagging bridge arm by using the switch K, that is, connected between controllable switching transistors S1 and S2. Because the impedance adjustment branch includes only one inductive branch, the inductive branch is an adjustment branch. A controller is not shown in FIG. 3a, and the controller controls on or off of the switch K in the inductive branch.

It should be noted that, when transmission efficiency between the wireless charging transmitting apparatus and a wireless charging receiving apparatus is not considered, an output power of the DC-to-AC inverter circuit 201 is equivalent to an output power of the wireless charging receiving apparatus, and the transmission efficiency is usually less than 100%. There is a specific conversion relationship between the output power of the DC-to-AC inverter circuit and the output power of the wireless charging receiving apparatus. Therefore, it may also be understood as that the controller controls on or off of the switch K in the inductive branch based on a present phase shift angle of the DC-to-AC inverter circuit 201 and the output power of the wireless charging receiving apparatus. The output power of the wireless charging receiving apparatus is an output power of a wireless charging system.

In FIG. 3a, a turn-off current in the lagging bridge arm is $I_1$, a current in the inductive branch is $I_L$, and a current flowing into the compensation circuit 206 is $I_2$, that is, $I_2$ is also an output current of the DC-to-AC inverter circuit 201. A relationship among the three parameters is as follows:

$$I_1 = I_L + I_2 \quad (1)$$

Referring to the formula (1), when the inductive branch is disconnected, $I_L=0$. In this case, the turn-off current $I_1$ in the lagging bridge arm is equal to the current $I_2$ flowing into the compensation circuit. When the inductive branch is connected, the inductive branch injects the inductive current $I_L$ into the lagging bridge arm. This may affect composition of the current $I_1$ in the lagging bridge arm. For details, further refer to schematic diagrams of waveform relationships shown in FIG. 3b and FIG. 3c. In the figures, θ represents a phase shift angle.

In this case, the controller controls on/off of the switch in the inductive branch, to control whether the inductive branch injects the inductive current $I_L$ into the lagging bridge arm.

When the output power of the DC-to-AC inverter circuit is determined, connectivity of the inductive branch may be controlled based on the phase shift angle.

Figure 3B:
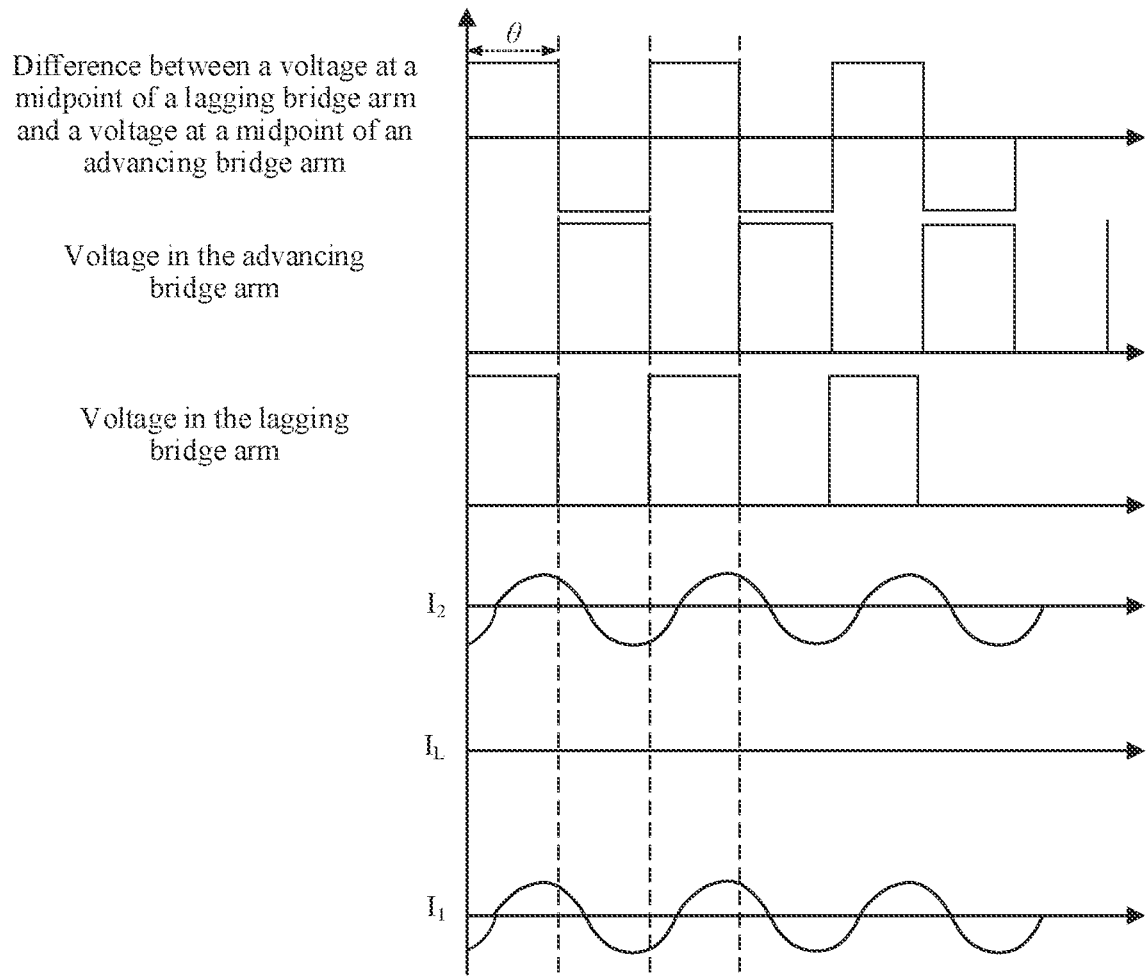
FIG. 3b is a schematic diagram of a waveform relationship existing when a phase shift angle corresponding to FIG. 3a is relatively large.

As shown in FIG. 3b, specifically, when the phase shift angle is relatively large, a phase of the current $I_2$ (that is, the output current of the DC-to-AC inverter circuit 201) flowing into the compensation circuit 206 already lags behind a phase of an output voltage $U_1$ (a voltage at the midpoint of the lagging bridge arm relative to a negative bus) of the lagging bridge arm of the DC-to-AC inverter circuit 201. When the current $I_1$ in the lagging bridge arm is the current $I_2$ flowing into the compensation circuit 206, the controllable switching transistors S1 and S2 can already implement ZVS. In this case, the controller controls the switch K in the inductive branch to be turned off, and the inductive branch does not inject the inductive current $I_L$ into the lagging bridge arm, to avoid power consumption caused by inductor connection.

Figure 3C:
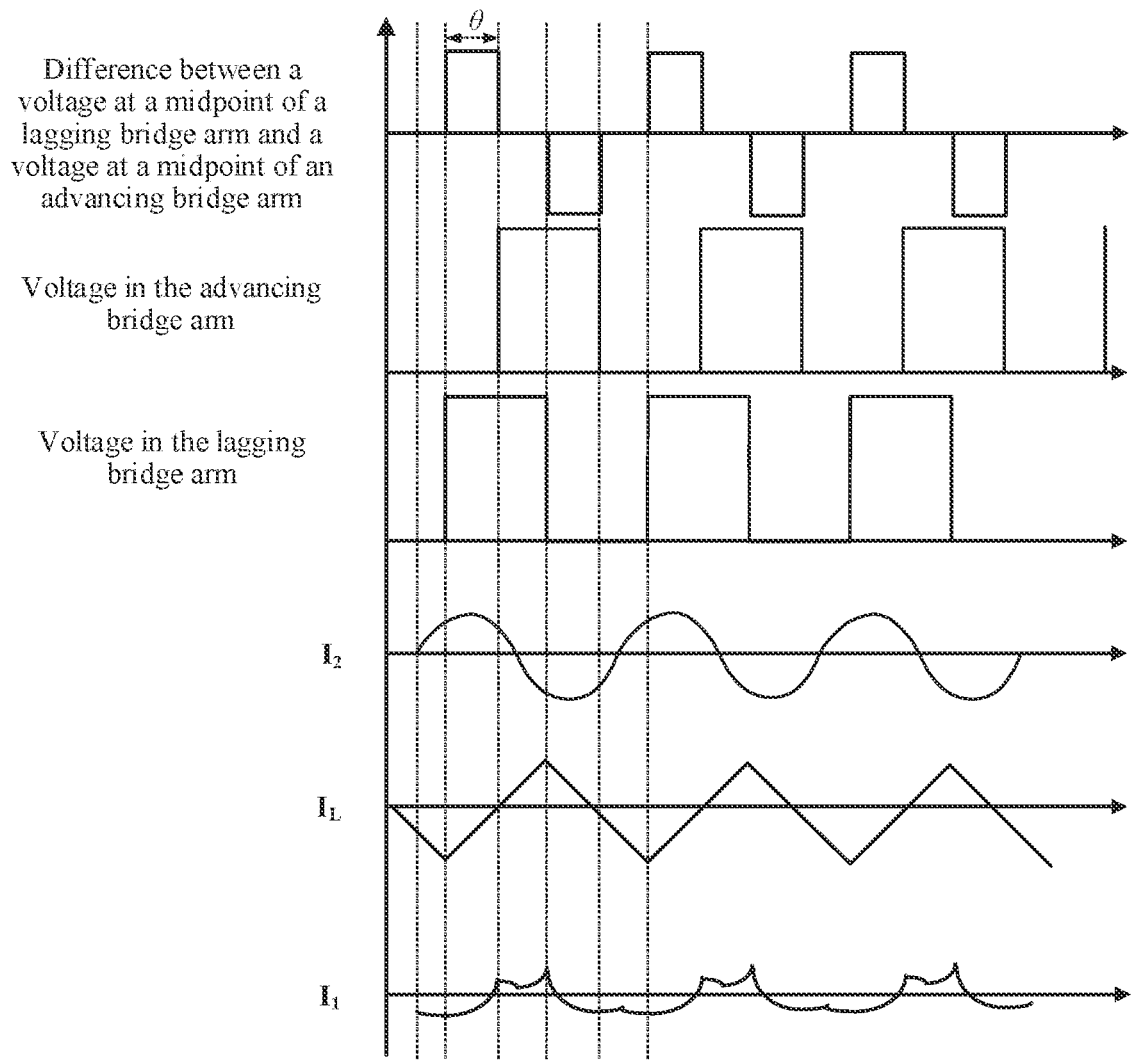
FIG. 3c is a schematic diagram of a waveform relationship existing when the phase shift angle corresponding to FIG. 3a is relatively small.

As shown in FIG. 3c, when the phase shift angle is relatively small, a phase of the current $I_2$ flowing into the compensation circuit 206 precedes a phase of an output voltage $U_1$ of the lagging bridge arm of the DC-to-AC inverter circuit 201, and the controllable switching transistors S1 and S2 of the lagging bridge arm cannot implement ZVS. In this case, the controller controls the switch K in the inductive branch to be closed, so that the inductive branch injects the inductive current $I_L$ into the lagging bridge arm. The inductive current $I_L$ is added to the current $I_2$ flowing into the compensation circuit 206, so that a phase of a current in the lagging bridge arm lags behind the phase of the output voltage $U_1$ of the lagging bridge arm of the DC-to-AC inverter circuit 201. In this way, the controllable switching transistors S1 and tube S2 of the lagging bridge arm implement ZVS.

A maximum value that can be reached by the turn-off current in the lagging bridge arm when the controllable switching transistor of the lagging bridge arm implements ZVS may be preset to a preset current $I_0$. Different output powers of the DC-to-AC inverter circuit 201 correspond to different preset currents $I_0$. A phase shift angle $\theta_0$ corresponding to the preset current $I_0$ is obtained in advance for each two-dimensional curve, and two phase shift angle intervals are obtained through division by using the phase shift angle $\theta_0$ as a preset angle: a phase shift angle interval in which a phase shift angle is greater than the preset angle $\theta_0$ and a phase shift angle interval in which a phase shift angle is less than or equal to the preset angle $\theta_0$.

Figure 4A:
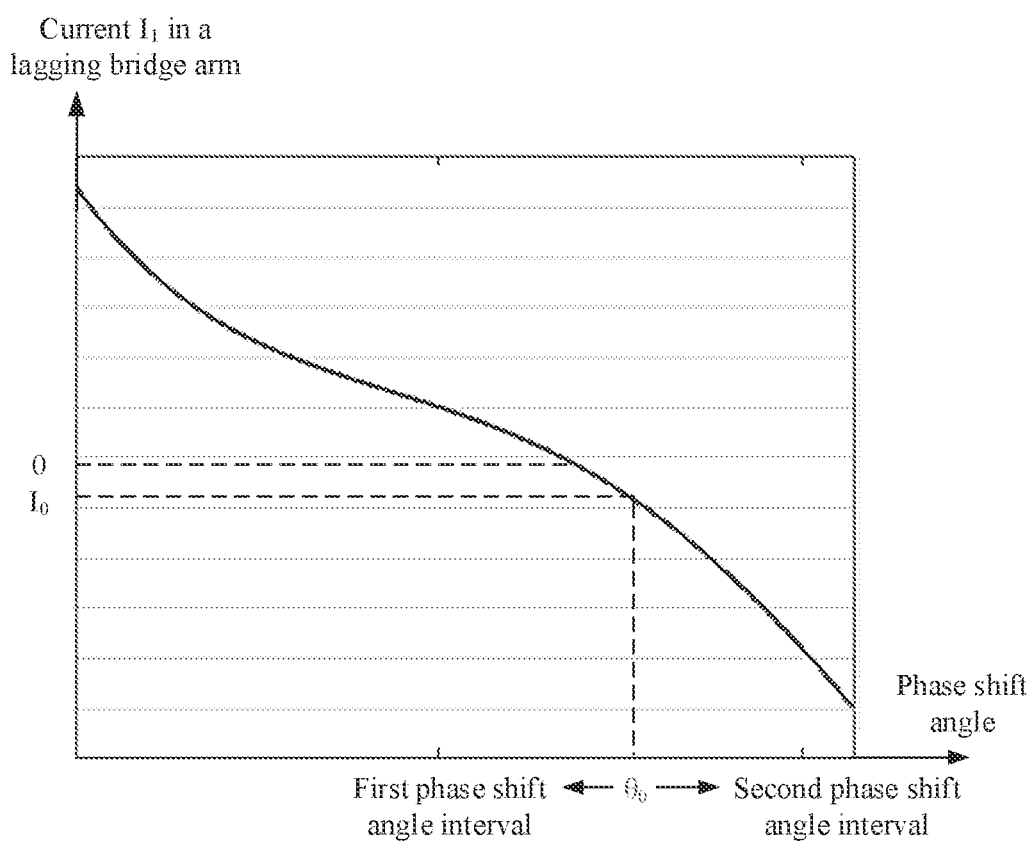
FIG. 4a is a graph showing a relationship curve that is of a current $I_1$ in a lagging bridge arm and a phase shift angle and that exists when an impedance adjustment branch includes one inductive branch according to Embodiment 2 of this application.

FIG. 4a is a graph showing a relationship curve that is of $I_1$ and a phase shift angle and that exists when an impedance adjustment branch includes one inductive branch according to Embodiment 2 of this application.

When the inductive branch is not connected, $I_2$ is equal to $I_1$.

Using a direction in which a current flows out of the lagging bridge arm as a positive direction, it is predetermined that under different output powers of the DC-to-AC inverter circuit, a maximum value that is of the turn-off current in the lagging bridge arm and that can enable the controllable switching transistor of the lagging bridge arm to implement ZVS is set to the preset current $I_0$ ($I_0<0$). It may be understood that the preset current may alternatively be appropriately adjusted according to an actual requirement. For example, a current value that is less than $I_0$ but relatively close to $I_0$ may be selected as the preset current.

A phase shift angle corresponding to the preset current $I_0$ is a preset angle $\theta_0$. In this case, an interval to which a phase shift angle less than $\theta_0$ belongs is a first phase shift angle interval, and an interval to which a phase shift angle greater than $\theta_0$ belongs is a second phase shift angle interval.

When the present phase shift angle of the DC-to-AC inverter circuit is within the first phase shift angle interval, that is, the present phase shift angle is less than the preset angle, the controllable switching transistor of the lagging bridge arm cannot implement ZVS, and the controller needs to control the inductive branch to be connected, to inject the inductive current into the midpoint of the lagging bridge arm. When the present phase shift angle of the DC-to-AC inverter circuit is within the second phase shift angle interval, that is, the present phase shift angle is greater than the preset angle, the controllable switching transistor of the lagging bridge arm can already implement ZVS, and the inductive branch may be disconnected to reduce power consumption.

Then, the second control manner of the controller is described.

The controller controls on or off of a switch in the inductive branch based on a current flowing into a compensation circuit or a current flowing out of a lagging bridge arm at a turn-off moment of a controllable switching transistor of the lagging bridge arm.

Figure 4B:
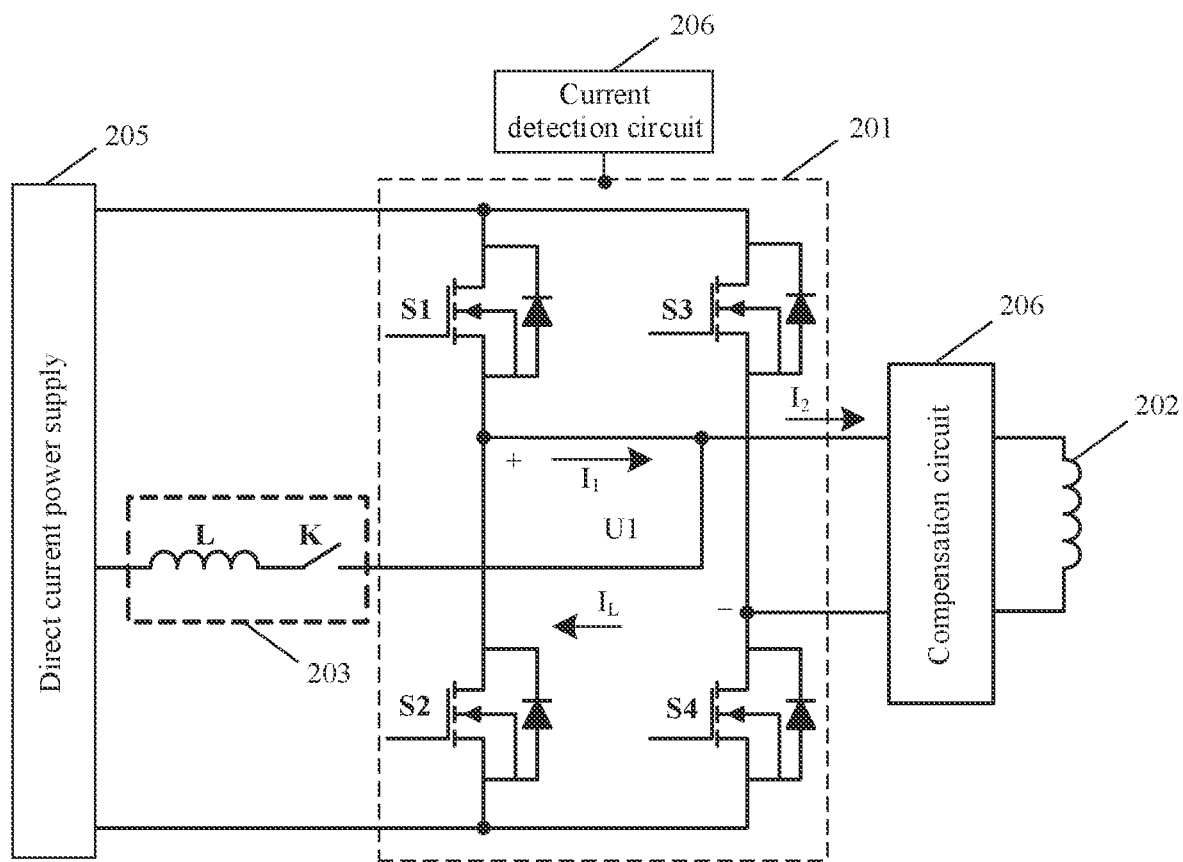
FIG. 4b is another circuit diagram in which an impedance adjustment branch includes one inductive branch according to this application.

FIG. 4b is another circuit diagram in which an impedance adjustment branch includes one inductive branch according to Embodiment 2 of this application.

The circuit provided in this embodiment further includes a current detection circuit 206.

The current detection circuit 206 is configured to: detect the current flowing into the compensation circuit or the current flowing out of the lagging bridge arm at the turn-off moment of the controllable switching transistor of the lagging bridge arm, and send, to the controller, the detected current flowing into the compensation circuit or current flowing out of the lagging bridge arm at the turn-off moment of the controllable switching transistor of the lagging bridge arm.

When the adjustment branch includes only one inductive branch and the inductive branch is disconnected, the current flowing into the compensation circuit is equal to the current flowing out of the lagging bridge arm. Therefore, the following uses an example in which the current detection circuit 206 detects the current flowing into the compensation circuit for description.

Referring to FIG. 4a, the current detection circuit 206 detects that a current flowing into the compensation circuit at the turn-off moment of the controllable switching transistor of the lagging bridge arm is $I_3$. It may be understood that when none of the inductive branches is connected, the current $I_3$ is equal to the current flowing out of the lagging bridge arm. The controller compares $I_3$ with a preset current $I_0$. When $I_3>I_0$, the controllable switching transistor of the lagging bridge arm cannot implement ZVS, and the controller controls the inductive branch to be connected. The inductive branch injects an inductive current into the midpoint of the lagging bridge arm, so that the controllable switching transistor of the lagging bridge arm implements ZVS. When $I_3<I_0$, the controllable switching transistor of the lagging bridge arm can already implement ZVS. The controller disconnects the inductive branch to reduce power consumption.

(2) The Adjustment Branch Includes at Least Two Inductive Branches.

The controller controls an on/off state of a switch in each inductive branch, and can adjust a magnitude of an inductive current injected by an impedance adjustment circuit into the lagging bridge arm, so that the controllable switching transistor of the lagging bridge arm implements ZVS under different phase shift angles. A quantity of inductive branches is not specifically limited in this application, and may be selected and set based on an actual requirement and a size and costs of hardware. A larger quantity of inductive branches corresponds to a larger quantity of presented inductance values, and corresponds to more accurate matching for a phase shift angle.

The following provides descriptions by using an example in which the adjustment branch includes at least two inductive branches; a first inductive branch and a second inductive branch. The first inductive branch includes a first inductor and a first switch, a first end of the first inductor is connected to an output port of a direct current power supply, and a second end of the first inductor is connected to a midpoint of a lagging bridge arm by using the first switch. The second inductive branch includes a second inductor and a second switch, a first end of the second inductor is connected to the output port of the direct current power supply, and a second end of the second inductor is connected to the midpoint of the lagging bridge arm by using the second switch.

Figure 5A:
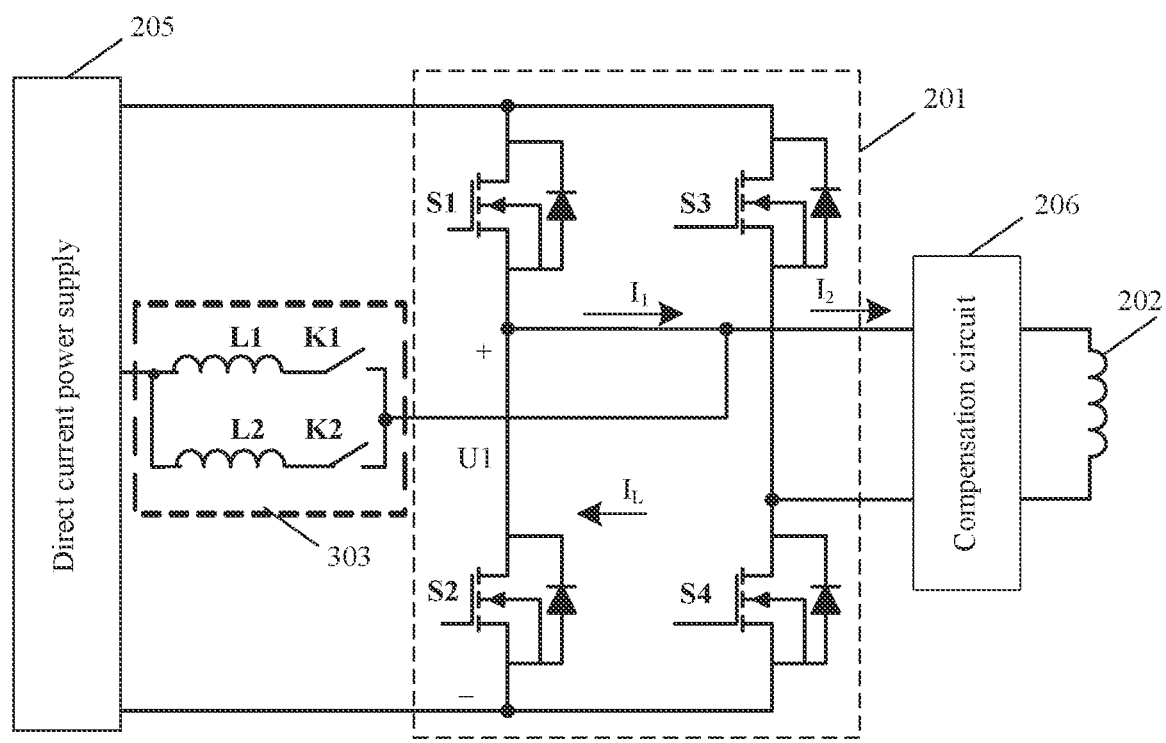
FIG. 5a is a circuit diagram in which an impedance adjustment branch includes two inductive branches according to Embodiment 2 of this application.

FIG. 5a is a circuit diagram in which an impedance adjustment branch of a wireless charging transmitting apparatus includes two inductive branches.

For descriptions of a DC-to-AC inverter circuit 201, a transmitting coil 202, a direct current power supply 205, and a compensation circuit 206 in the circuit, refer to the foregoing descriptions, and details are not described herein again.

An impedance adjustment circuit 303 includes a first inductive branch and a second inductive branch. The first inductive branch includes a first inductor L1 and a first switch K1 that are connected in series, a first end of L1 is connected to an output port of the direct current power supply, and a second end of L1 is connected to a midpoint of a lagging bridge arm by using K1. The second inductive branch includes a second inductor L2 and a second switch K2 that are connected in series, a first end of L2 is connected to the output port of the direct current power supply, and a second end of L2 is connected to the midpoint of the lagging bridge arm by using K2. Inductances of the first inductor L1 and the second inductor L2 may be the same or may be different. This is not specifically limited in this application.

A controller (not shown) controls on or off of the first switch K1 and the second switch K2 based on a present phase shift angle and a present output power of the DC-to-AC inverter circuit 201. Alternatively, the controller controls on or off of the first switch K1 and the second switch K2 based on a current in the lagging bridge arm that is at a turn-off moment of a controllable switching transistor (namely, a controllable switching transistor S1 or S3) of the lagging bridge arm.

The first inductive branch and the second inductive branch are connected in parallel to form an adjustment branch, a first end of the adjustment branch is connected to the output port of the direct current power supply 205, and a second end of the adjustment branch is connected to the midpoint of the lagging bridge arm, that is, connected between controllable switching transistors S1 and S2.

In FIG. 5a, a turn-off current in the lagging bridge arm is $I_1$, a current in the adjustment branch is $I_L$, and an output current in the DC-to-AC inverter circuit 201 is $I_2$. The three parameters still satisfy the formula (1), that is, $I_1=I_L+I_2$. The current $I_L$ in the adjustment branch is a sum of currents that pass through the two inductive branches.

The adjustment branch injects the inductive current $I_L$ into the lagging bridge arm, to affect reactance of the turn-off current b in the lagging bridge arm. In this case, the controller controls on/off of a switch in each inductive branch, to control a magnitude of the inductive current $I_L$ injected by the inductive branches into the lagging bridge arm.

When neither of the inductive branches is connected, the turn-off current $I_1$ in the lagging bridge arm is equal to the current $I_2$ flowing into the compensation circuit. Still using a direction in which a current flows out of the lagging bridge arm as a positive direction, correspondences between phase shift angles of the DC-to-AC inverter circuit under different output powers and the turn-off current $I_1$ in the lagging bridge arm are pre-established. In this case, the correspondences are also correspondences between the phase shift angles of the DC-to-AC inverter circuit at the different output powers and the current $I_2$ flowing into the compensation circuit. Different output powers correspond to different correspondences.

Figure 5B:
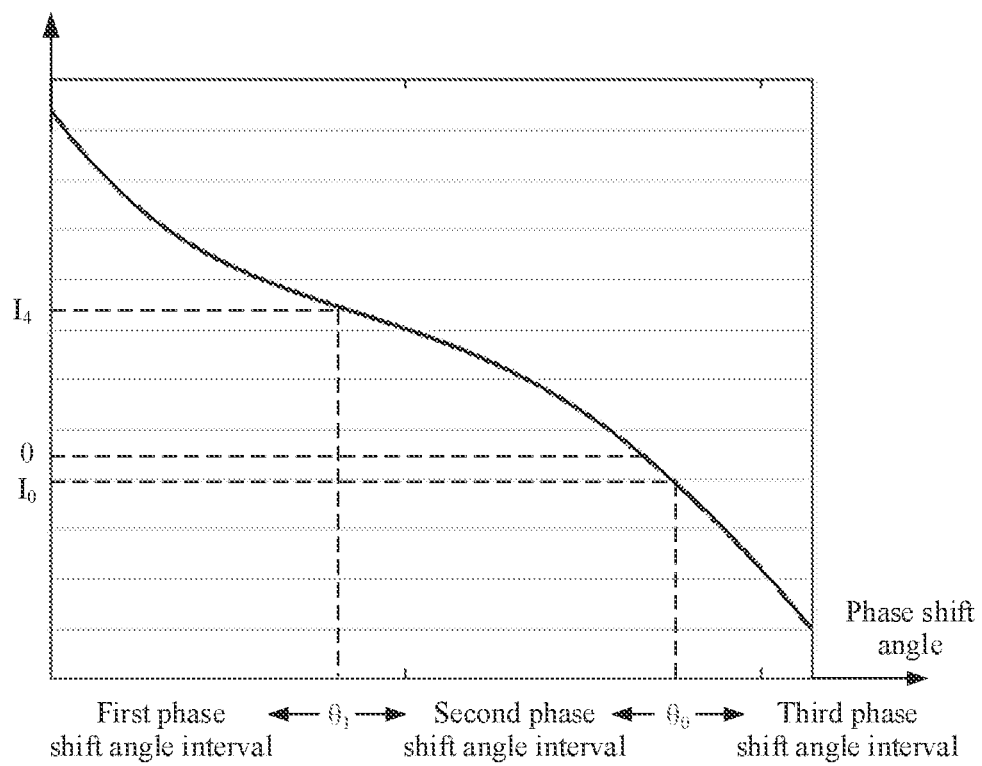

FIG. 5b is a graph showing a relationship curve that is of a current $I_1$ in a lagging bridge arm and a phase shift angle and that exists when an impedance adjustment branch includes two inductive branches according to Embodiment 2 of this application.

When neither of the inductive branches is connected, $I_2$ is equal to $I_1$. A maximum value that can be reached by the turn-off current in the lagging bridge arm when the controllable switching transistor of the lagging bridge arm implements ZVS is preset to a preset current $I_0$. When one inductive branch is connected, $I_2$ is not equal to $I_1$, and the connected inductive branch affects a magnitude of $I_1$.

The following uses an example in which an inductive branch is already connected for description. When the controllable switching transistor of the lagging bridge arm implements ZVS, a maximum value that can be reached by the turn-off current in the lagging bridge arm is set to a threshold current $I_4$, and the threshold current $I_4$ is greater than the preset current $I_0$. Different output powers of the DC-to-AC inverter circuit 201 correspond to different preset currents $I_0$ and threshold currents $I_4$. A preset angle $\theta_0$ corresponding to the preset current Jo and a threshold angle $\theta_1$ corresponding to the threshold current $I_4$ are separately obtained in advance for each two-dimensional curve, and three different phase shift angle intervals are obtained through division sequentially by using the preset angle $\theta_0$ and the threshold angle $\theta_1$: a first phase shift angle interval, a second phase shift angle interval, a third phase shift angle interval.

When the present phase shift angle of the DC-to-AC inverter circuit is within the first phase shift angle interval, the controllable switching transistor of the lagging bridge arm cannot implement ZVS, and a relatively large inductive current needs to be injected into the inductive branch. The controller controls both the first inductive branch and the second inductive branch to be connected, and injects an abundant supply of inductive currents into the midpoint of the lagging bridge arm. When the present phase shift angle of the DC-to-AC inverter circuit is within the second phase shift angle interval, the controllable switching transistor of the lagging bridge arm cannot implement ZVS. In this case, the controller controls either of the first inductive branch and the second inductive branch to be connected, and injects an inductive current into the midpoint of the lagging bridge arm, so that the controllable switching transistor of the lagging bridge arm can implement ZVS. When the present phase shift angle of the DC-to-AC inverter circuit is within the third phase shift angle interval, that is, when a phase shift angle interval to which the present phase shift angle belongs is an interval in which any phase shift angle is greater than the preset angle, the controllable switching transistor of the lagging bridge arm can implement ZVS, and the inductive branches may be disconnected to reduce power consumption.

In addition, when the preset current $I_0$ and the threshold current $I_4$ are set, appropriate adjustment may be performed according to an actual requirement. For example, a current value that is less than $I_0$ but is relatively close to Jo may be set to the preset current, or a current value that is less than $I_4$ but is relatively close to $I_4$ may be set to the threshold current. In this way, when the present phase shift angle is exactly less than $\theta_0$ (exactly within the second phase shift angle interval), it is ensured that the controllable switching transistor of the lagging bridge arm can implement ZVS; or when the current is slightly less than $I_4$, it is ensured that the controllable switching transistor of the lagging bridge arm can implement ZVS by connecting only one inductive branch.

The following describes, with reference to the accompanying drawings, a working principle of controlling, by the controller, the switch in the inductive branch to be turned on or off, based on the current flowing out of the lagging bridge arm or the current flowing into the compensation circuit at the turn-off moment of the controllable switching transistor of the lagging bridge arm.

Figure 5C:
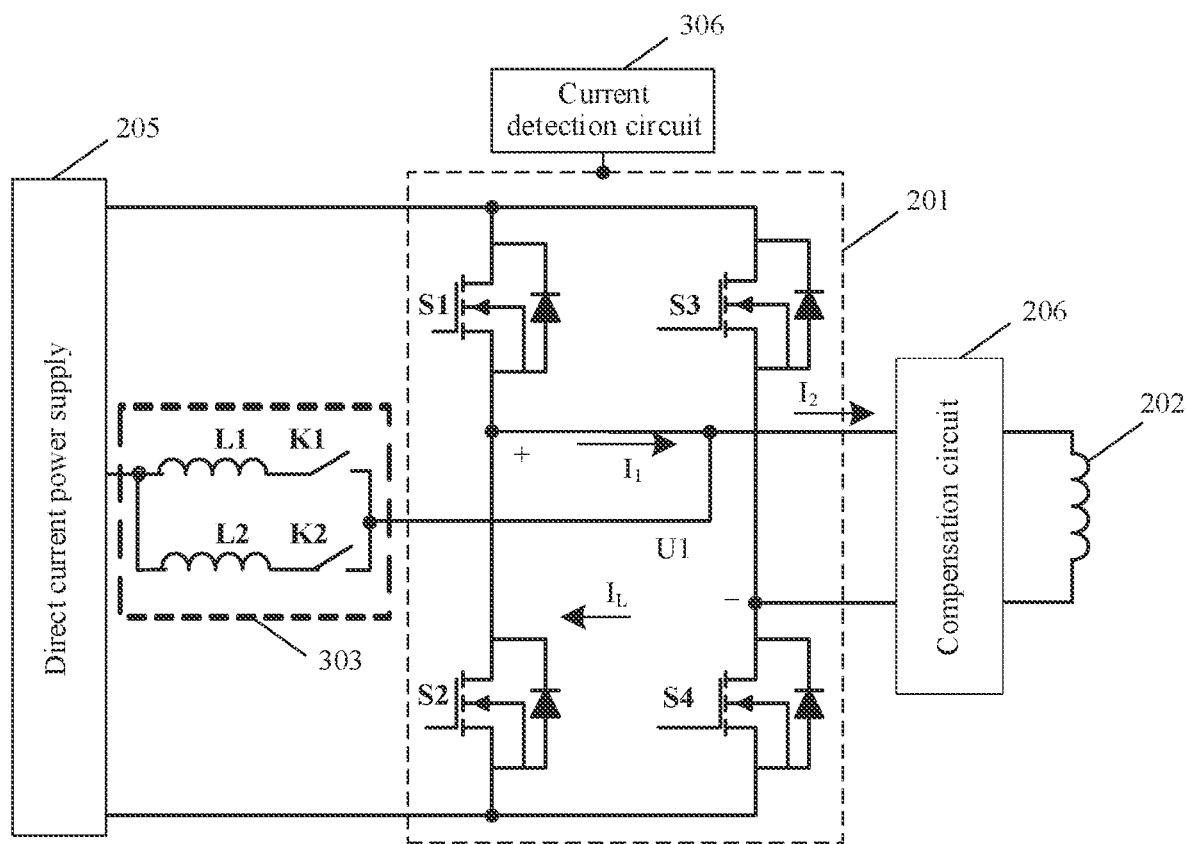
FIG. 5c is another circuit diagram in which an impedance adjustment branch includes two inductive branches according to Embodiment 2 of this application.

FIG. 5c is another circuit diagram in which an impedance adjustment branch includes two inductive branches according to Embodiment 2 of this application.

The circuit provided in this embodiment further includes a current detection circuit 306. The current detection circuit 306 is configured to: detect a current flowing into the compensation circuit or a current flowing out of the lagging bridge arm at a turn-off moment of the controllable switching transistor of the lagging bridge arm, and send, to the controller, the detected current flowing into the compensation circuit or current flowing out of the lagging bridge arm at the turn-off moment of the controllable switching transistor of the lagging bridge arm. When neither of the inductive branches is connected, the current detection circuit 306 detects that the current flowing into the compensation circuit at the turn-off moment of the controllable switching transistor of the lagging bridge arm is $I_3$, and the current $I_3$ is equal to the current flowing out of the lagging bridge arm. The controller compares $I_3$ with a preset current. If falls within different intervals different quantities of inductive branches are controlled to be closed.

When $I_3 > I_4$, the controllable switching transistor of the lagging bridge arm cannot implement ZVS and requires a relatively large inductive current, and the controller controls both a first inductive branch and a second inductive branch to be connected, to inject an abundant supply of inductive currents into the midpoint of the lagging bridge arm. When $I_4 > I_3 > I_0$, the controllable switching transistor of the lagging bridge arm cannot implement soft switching. In this case, the controller only needs to control either of the first inductive branch and the second inductive branch to be connected, to inject an abundant supply of inductive currents into the midpoint of the lagging bridge arm. When $I_3 < I_0$, the controllable switching transistor of the lagging bridge arm can already implement ZVS, and the controller disconnects the inductive branches to reduce power consumption.

When an inductive branch is already connected, the current detection circuit 306 may detect a current flowing out of the lagging bridge arm at the turn-off moment of the controllable switching transistor of the lagging bridge arm, and send a detection result to the controller. The controller first obtains a current flowing into the compensation circuit, based on the current flowing out of the lagging bridge arm at the turn-off moment of the controllable switching transistor of the lagging bridge arm and a present quantity of closed inductive branches, then obtains a difference between the current flowing into the compensation circuit and a preset current, and controls on and off of switches in the inductive branch based on the difference, where different differences correspond to different quantities of closed inductive branches.

Apparatus Embodiment 3

At least one inductive branch of a wireless charging transmitting apparatus provided in this embodiment of this application further includes a first diode and a second diode. An anode of the first diode is connected to a common end of an inductor and a switch in the inductive branch, and a cathode of the first diode is connected to a positive direct current bus at an output end of a direct current power supply. A cathode of the second diode is connected to the common end of the inductor and the switch in the inductive branch, and an anode of the second diode is connected to a negative direct current bus at the output end of the direct current power supply. The first diode and the second diode form a diode clamp circuit. The following provides specific descriptions with reference to the accompanying drawings.

First, an example in which an impedance adjustment circuit includes one inductive branch is used for description.

Figure 6A:
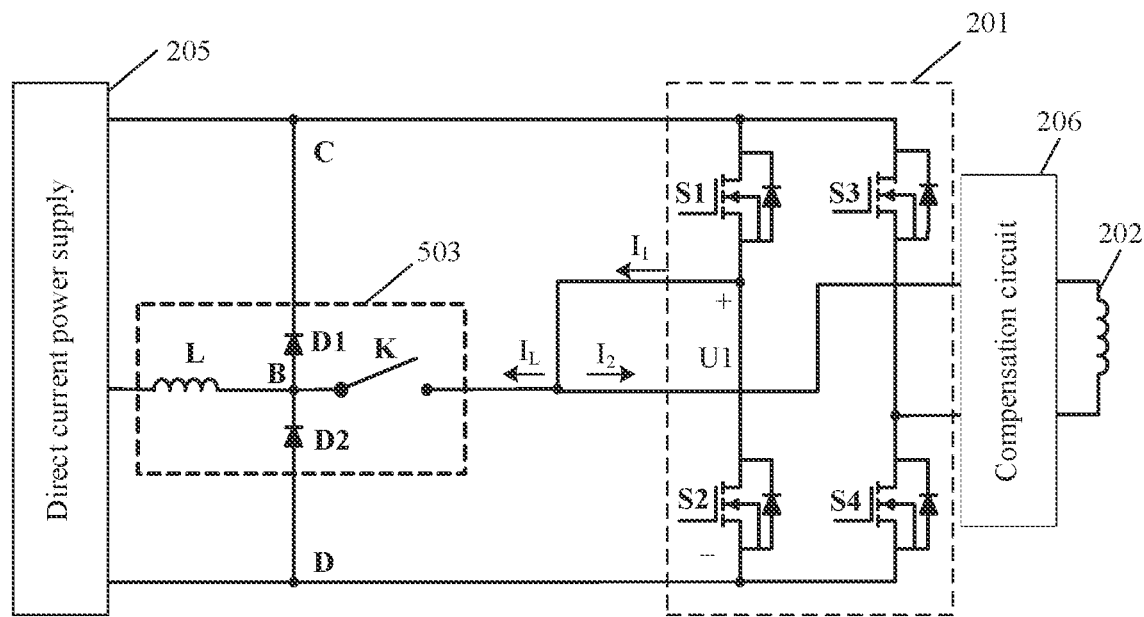
FIG. 6a is a circuit diagram in which an impedance adjustment circuit includes one inductive branch and the inductive branch includes a diode clamp circuit.

FIG. 6a is a circuit diagram in which an adjustment branch includes one inductive branch and the inductive branch includes a diode clamp circuit.

For descriptions of a DC-to-AC inverter circuit 201, a transmitting coil 202, a direct current power supply 205, a compensation circuit 206, and a controller (not shown in FIG. 6a), refer to Apparatus Embodiment 1, and details are not described herein again.

An impedance adjustment circuit 503 includes one inductive branch, and the inductive branch includes an inductor L and a switch K that are connected in series. The inductive branch further includes a first diode D1 and a second diode D2. An anode of the first diode D1 is connected to a common end of the inductor L and the switch K, a cathode of the first diode D1 is connected to a positive direct current bus of the direct current power supply 205, a cathode of the second diode D2 is connected to the common end of the inductor L and the switch K, and an anode of the second diode D2 is connected to a negative direct current bus of the direct current power supply 205.

A direction in which a current $I_L$ in the impedance adjustment branch flows out of a midpoint of a lagging bridge arm is used as a positive direction. When the controller controls the switch K from being closed to being open, and a current of the present inductor is negative, the first diode D1 is conducted, and the second diode D2 is cut off. The conducted first diode D1 provides a freewheeling path for the inductor L.

When the controller controls the switch K from being closed to being open, and the current of the present inductor is positive, the first diode D1 is cut off, and the second diode D2 is conducted. The conducted second diode D2 provides a freewheeling path for the inductor L.

In addition, the diode clamp circuit can further stabilize a voltage $U_B$ at the common end B of the inductor L and the switch K within a safety range. For example, both the first diode D1 and the second diode D2 are silicon diodes, and a conduction voltage drop of a silicon diode is 0.7 V. A voltage of the positive direct current bus of the direct current power supply 205 is $U_C$, and a voltage of the negative direct current bus of the direct current power supply 205 is $U_D$. When $U_B - U_C > 0.7$ V, the first diode D1 is conducted. When $U_D - U_B > 0.7$ V, the second diode D2 is conducted. Therefore, the diode clamp circuit may enable the voltage $U_B$ to satisfy $U_D - 0.7$ V $< U_B < U_C + 0.7$ V. That is, an absolute value of a difference between a peak value of $U_B$ and each of the voltages of the positive and negative direct current buses of the direct current power supply 205 is limited to be less than a conduction voltage drop of a diode, providing a circuit protection function.

Because the impedance adjustment circuit may further include a plurality of inductive branches connected in parallel, all inductive branches are connected in parallel to form an adjustment branch. In addition, the foregoing diode clamp circuit may be added to at least one of the inductive branches, so that when a switch in each inductive branch including the foregoing diode clamp circuit is turned off, a freewheeling path can be provided for an inductor on the inductive branch, and further, a voltage peak in each inductive branch can be limited and stabilized within the safety range, improving circuit reliability and stability.

The following provides descriptions by using an example in which the adjustment branch includes at least two inductive branches: a first inductive branch and a second inductive branch.

Figure 6B:
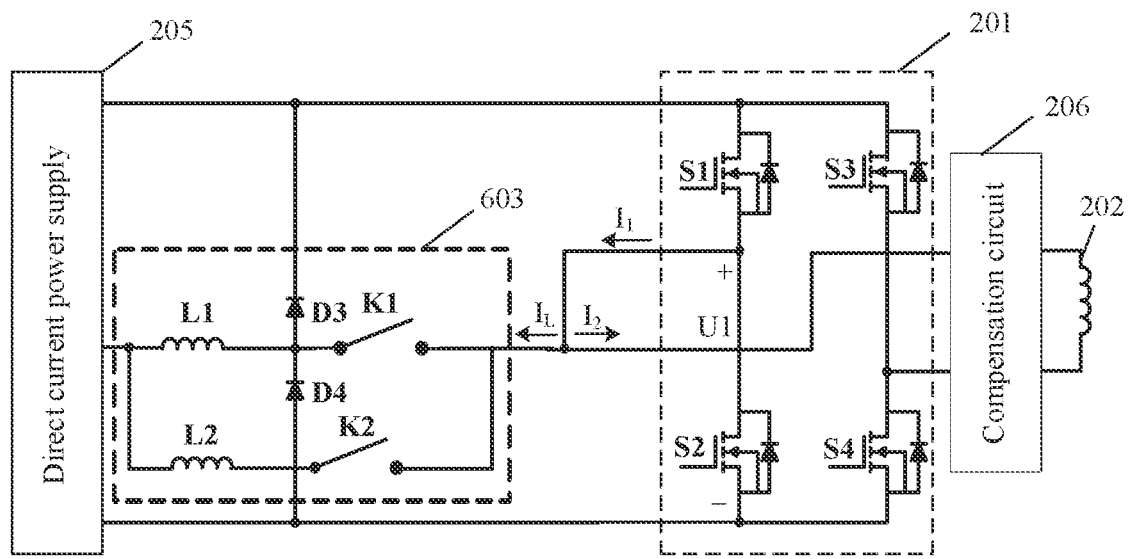
FIG. 6b is a circuit diagram in which an adjustment branch includes two inductive branches and a first inductive branch includes a diode clamp circuit.

FIG. 6b is a circuit diagram in which an adjustment branch includes two inductive branches and a first inductive branch includes a diode clamp circuit.

For descriptions of a DC-to-AC inverter circuit 201, a transmitting coil 202, a direct current power supply 205, a compensation circuit 206, and a controller (not shown in FIG. 6b), refer to Apparatus Embodiment 1, and details are not described herein again.

An impedance adjustment circuit 603 includes two inductive branches. A first inductive branch includes a first inductor L1 and a first switch K1 that are connected in series, and further includes a first diode D3 and a second diode D4. An anode of the first diode D3 is connected to a common end of the first inductor L1 and the switch K1 in the first inductive branch, a cathode of the first diode D3 is connected to a positive direct current bus of the direct current power supply 205, a cathode of the second diode D4 is connected to the common end of the first inductor L and the first switch K1 in the first inductive branch, and an anode of the second diode D4 is connected to a negative direct current bus of the direct current power supply 205. A second inductive branch includes a second inductor L2 and a second switch K2 that are connected in series.

When the diode clamp circuit includes the first diode D3 and the second diode D4, for a working principle, refer to related descriptions of a corresponding part of the circuit shown in FIG. 6a. Details are not described herein again.

Figure 7:
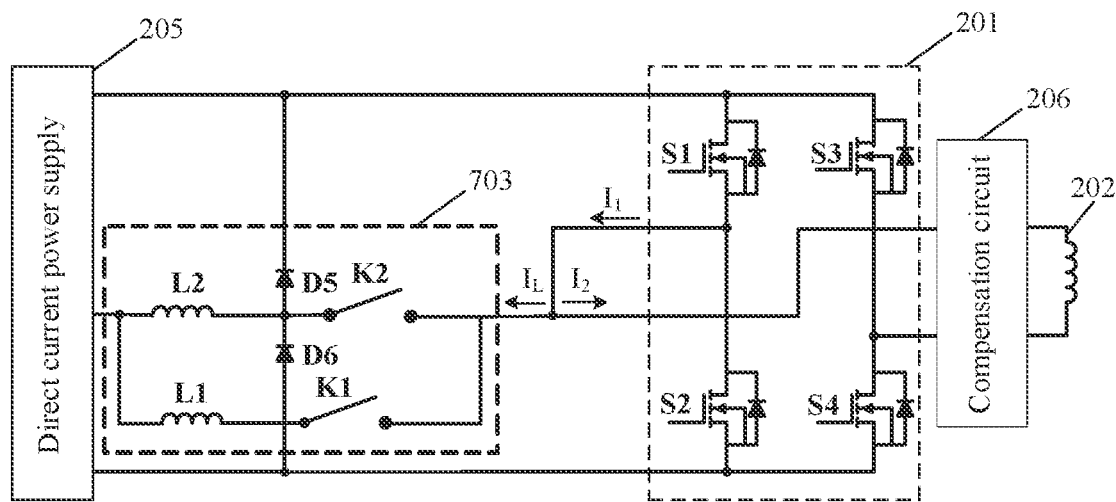
FIG. 7 is a circuit diagram in which an adjustment branch includes two inductive branches and a second inductive branch includes a diode clamp circuit.

FIG. 7 is a circuit diagram in which an adjustment branch includes two inductive branches and a second inductive branch includes a diode clamp circuit.

A difference between the circuit shown in FIG. 7 and the circuit shown in FIG. 6b is that a second inductive branch of the circuit shown in FIG. 7 includes a first diode D5 and a second diode D6, an anode of the first diode D5 is connected to a common end of a second inductor L2 and a second switch K2 in the second inductive branch, a cathode of the first diode D5 is connected to a positive direct current bus of the direct current power supply 205, a cathode of the second diode D6 is connected to the common end of the second inductor L2 and the second switch K2 in the second inductive branch, and an anode of the second diode D6 is connected to a negative direct current bus of the direct current power supply 205.

When the diode clamp circuit includes the first diode D5 and the second diode D6, for a working principle, refer to related descriptions of a corresponding part of the circuit shown in FIG. 6a. Details are not described herein again.

Figure 8:
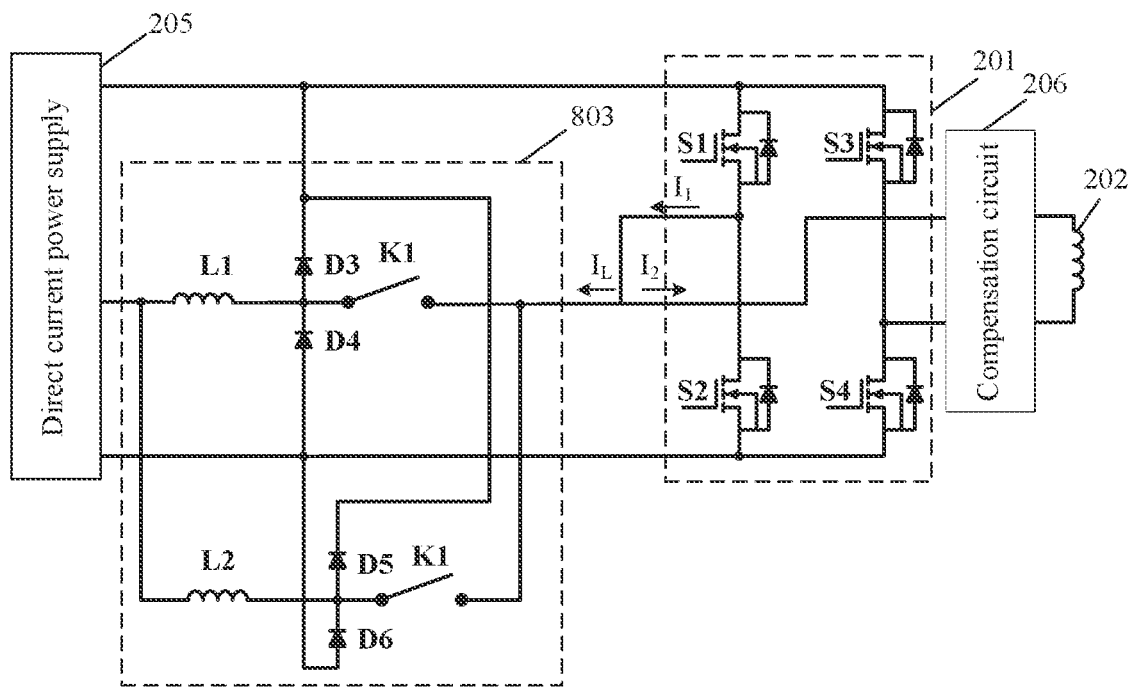
FIG. 8 is a circuit diagram in which an adjustment branch includes two inductive branches and each of the inductive branches includes a diode clamp circuit.

FIG. 8 is a circuit diagram in which an adjustment branch includes two inductive branches and each of the inductive branches includes a diode clamp circuit.

A first inductive branch of the circuit shown in FIG. 8 includes a first inductor L1 and a first switch K1 that are connected in series, and further includes a first diode D3 and a second diode D4. An anode of the first diode D3 is connected to a common end of the first inductor L1 and the first switch K1, a cathode of the first diode D3 is connected to a positive direct current bus of the direct current power supply 205, a cathode of the second diode D4 is connected to the common end of the first inductor L1 and the first switch K1, and an anode of the second diode D4 is connected to a negative direct current bus of the direct current power supply 205.

The second inductive branch includes a second inductor L2 and a second switch K2 that are connected in series, and further includes a first diode D5 and a second diode D6. An anode of the first diode D5 is connected to a common end of the second inductor L2 and the second switch K2, the cathode of the first diode D5 is connected to a positive direct current bus of the direct current power supply 205, the cathode of the second diode D6 is connected to a common end of the second inductor L2 and the second switch K2, and the anode of the second diode D6 is connected to a negative direct current bus of the direct current power supply 205.

A diode clamp circuit formed by the first diode D3 and the second diode D4 acts on the first inductive branch, and a diode clamp circuit formed by the first diode D5 and the second diode D6 acts on the second inductive branch. For a working principle, refer to related descriptions of a corresponding part of the circuit shown in FIG. 6a. Details are not described herein again.

In the wireless charging transmitting apparatus provided in this embodiment of this application, a first diode and a second diode are added to at least one inductive branch. Two diodes are used to form a diode clamp circuit. When a switch in an inductive branch having a diode clamp circuit is turned off, a freewheeling path can be provided for an inductor in the inductive branch, and a voltage at a common end of an inductor and a switch in the inductive branch can be stabilized within a safety range. A circuit protecting function is provided.

For ease of description, the following apparatus embodiments each are described by using an example in which an adjustment branch includes at least two inductive branches: a first inductive branch and a second inductive branch. The first inductive branch includes a first inductor and a first switch that are connected in series, and the second inductive branch includes a second inductor and a second switch that are connected in series. It may be understood that, when a quantity of inductive branches included in the adjustment branch increases, a working principle in this case is similar to the working principle used when only two inductive branches are included.

Apparatus Embodiment 4

In this embodiment, a method for determining an inductance of an inductor in the inductive branch is specifically described by using an example in which an adjustment branch includes two inductive branches: a first inductive branch and a second inductive branch. It may be understood that the method may be extensively applied to a circuit scenario in which an adjustment branch includes more inductive branches connected in parallel.

Figure 9:
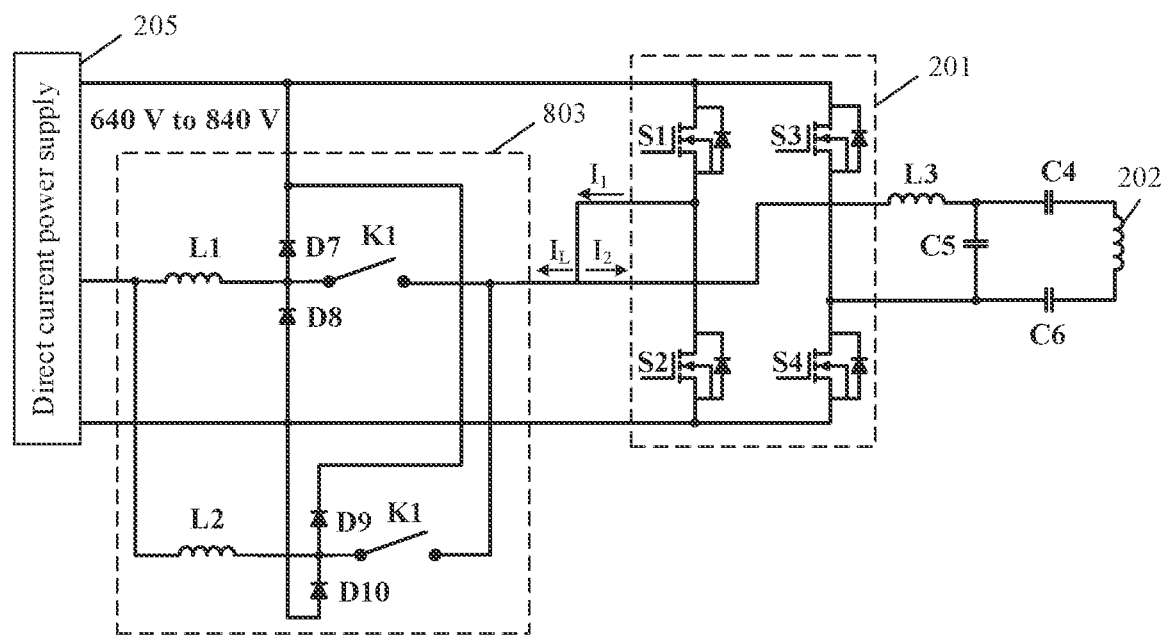
FIG. 9 is a circuit diagram of a wireless charging transmitting apparatus with an output power of 10 kW.

FIG. 9 is a circuit diagram of a wireless charging transmitting apparatus with an output power of 10 kW.

For descriptions of a DC-to-AC inverter circuit 201, a transmitting coil 202, an impedance adjustment circuit 803, a direct current power supply 205, and a controller (not shown in FIG. 9), refer to related descriptions of a corresponding part of the circuit shown in FIG. 8, and details are not described herein again.

A compensation circuit 206 in the transmitting apparatus may be of an LCL type or an LCC type. FIG. 9 shows a compensation circuit of an LCC type. The compensation circuit includes an inductor L3, a capacitor C4, a capacitor C5, and a capacitor C6. The following analysis is based on assumption of an LCC compensation circuit, but the following analysis is also applicable to an LCL compensation circuit. A type of the compensation circuit is not specifically limited in this application.

To make a person skilled in the art better understand the technical solutions provided in this application, the following specifically describes selection of a magnitude of an inductance of an inductor included in the impedance adjustment circuit.

The following uses an S2 turn-off process as an example for analysis. A method for analyzing an S1 turn-off process is similar to that for analyzing the S2 turn-off process. Therefore, details are not described again. In an ideal working condition, a current of an inductor remains constant during a switching process, and a current flowing out of a lagging bridge arm remains constant during the switching process. Based on a junction capacitance $C_{oss}$ of a controllable switching transistor, a bus voltage $U_{bus}$, and a dead time $\Delta t_{dead}$ of the lagging bridge arm, it may be obtained that when the controllable switching transistor of the lagging bridge arm implements ZVS, a minimum value of an absolute value $I_2$ of a negative current $I_2$ required at a turn-off moment of an output current of S2 of the DC-to-AC inverter circuit 201 is $I_{2min}$. Considering that the current $I_{2min}$ is constant within the dead time $\Delta t_{dead}$, if junction capacitors Cos, of the two controllable switching transistors of the bridge arm are respectively charged and discharged to the bus voltages $U_{bus}$ and zero by using the current $I_{2min}$, a formula 2 may be obtained, which is specifically as follows:

$$I_{2min} = -2 * C_{oss} * \frac{U_{bus}}{\Delta t_{dead}} \quad (2)$$

When $C_{oss}$=500 pF, $U_{bus}$=640 V, and $\Delta t_{dead}$=300 ns, it may be determined that $I_{2min}$=-2.133 A.

Figure 10:
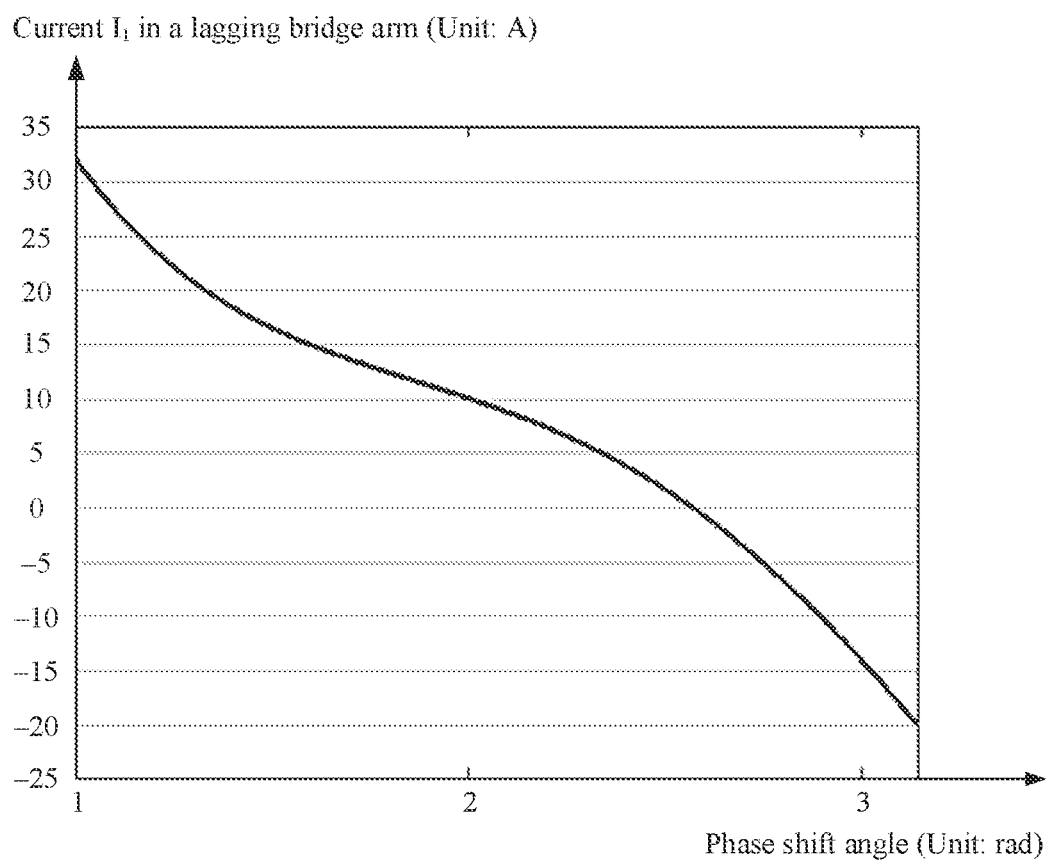
FIG. 10 is a graph showing a relationship curve that is of a current $I_1$ in a lagging bridge arm and a phase shift angle and that exists when the apparatus in FIG. 9 is not connected to an inductive branch and works at a constant power of 10 kW.

FIG. 10 is a graph showing a relationship curve that is of a current $I_1$ at a turn-off moment of S2 and a phase shift angle and that exists when the apparatus in FIG. 9 is not connected to an inductive branch and works at a constant full power of 10 kW The relationship curve may be obtained through simulation.

It can be learned from FIG. 10 that, when the apparatus is not connected to an inductive branch, the current $I_1$ at the turn-off moment of S2 increases with a decrease of the phase shift angle, and the current at the turn-off moment reaches a maximum value $I_{1max}$=32 A when the phase shift angle is 1. With reference to the formula (1), in this case, a peak current $I_{Lmax}$ that needs to be injected by the inductive branch into the lagging bridge arm needs to meet:

$$I_{Lmax} > I_{1max} - I_{2min} \quad (3)$$

To be specific, when $I_{Lmax}$>34.133 A, even if the minimum value of the phase shift angle is 1, the lagging bridge arm can implement ZVS. The following uses $I_{Lmax}$=35 A as an example to describe a process of determining an inductance.

A relationship among a switching period $T_{SW}$ of a switching transistor of the DC-to-AC inverter circuit 201, the bus voltage $U_{bus}$, a peak current $I_{Lmax}$ that needs to be injected by the inductive branch into the lagging bridge arm, and a maximum inductance $L_{MAX}$ of the adjustment branch is as follows: A voltage applied to an inductor in a voltage of an alternating current component in the lagging bridge arm is a square wave voltage with an amplitude of $U_{bus}/2$ in a switching period $T_{SW}$, and a waveform of a current of the inductor is a symmetrical triangular wave. Therefore, a formula (4) may be obtained based on a relationship between the current and the voltage of the inductor:

$$L_{MAX} = \frac{T_{sw} * U_{bus}}{8 * I_{Lmax}} \quad (4)$$

When $T_{SW}$=1/85 kHz, it may be determined, by using the formula (4), that $L_{MAX}$=26.9 μH.

The adjustment branch includes two inductive branches connected in parallel, and $L_{MAX}$ is an inductance value obtained after the first inductor L1 and the second inductor L2 are connected in parallel.

In a possible implementation, inductances of both the first inductor L1 and the second inductor L2 may be 53.8 μH. When one inductive branch is connected, a peak current injected by the adjustment branch into the lagging bridge arm is 17.5 A. When two inductive branches are connected, a peak current injected by the adjustment branch into the lagging bridge arm is 35 A.

When detecting that a DC-to-AC inverter has an output power of 10 kW the controller invokes a prestored curve shown in FIG. 10, and sets a preset phase shift angle based on the curve. When the phase shift angle is greater than 2.4756 rad, the controllable switching transistor of the lagging bridge arm can implement ZVS without connecting to the inductive branch. When the phase shift angle is between 2.4756 rad and 1.6 rad, one inductive branch needs to be connected so that the controllable switching transistor of the lagging bridge arm implements ZVS. When the phase shift angle is less than 1.6 rad, two inductive branches need to be connected so that the controllable switching transistor of the lagging bridge arm implements ZVS. Curves of correspondences that correspond to different powers and that are shown in FIG. 10 may be obtained in advance through simulation, and are stored in the controller. When the DC-to-AC inverter detects that a present output power is 7.7 kW, 3.3 kW or at another power level, the curve of the present correspondence is invoked through table lookup, and a preset angle required for switching an inductor is set. Then, the controller sets on/off of the inductor based on the present preset angle.

When the adjustment branch includes only the foregoing two inductive branches, under some phase shift angles, although the controllable switching transistor of the lagging bridge arm can implement ZVS, a valid value of the inductive current injected by the adjustment branch into the lagging bridge arm is caused to be excessively large, increasing a switching loss of the controllable switching transistor of the lagging bridge arm. To avoid the foregoing problem, a quantity of inductive branches that are connected in parallel in the adjustment branch may be controlled, and a magnitude of a current injected into the lagging bridge arm is controlled by controlling a quantity of connected inductive branches, so that an inductive current injected by the adjustment branch into the lagging bridge arm matches the phase shift angle.

Apparatus Embodiment 5

This embodiment specifically describes a connection relationship between a first end of an adjustment branch and an output end of a direct current power supply, where the first end of the adjustment branch may be directly connected to a direct current bus midpoint at the output end of the direct current power supply. The following separately provides descriptions with reference to the accompanying drawings.

Figure 11:
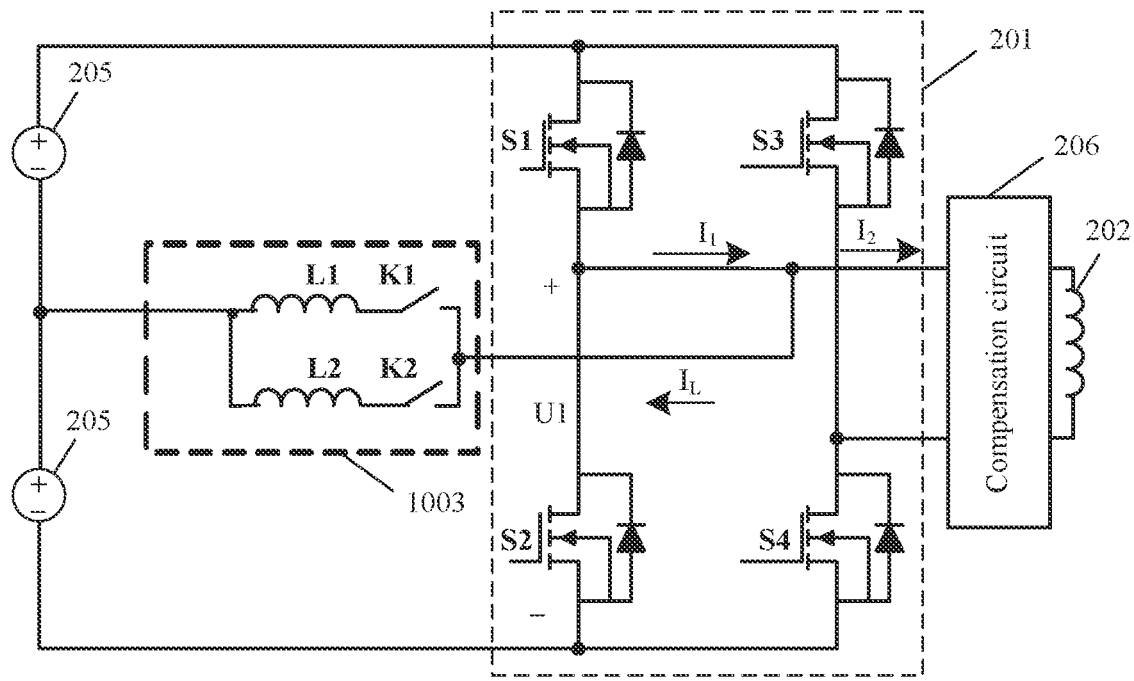
FIG. 11 is a circuit diagram in which a first end of an adjustment branch is connected to a direct current bus midpoint of a direct current power supply.

FIG. 11 is a circuit diagram in which a first end of an adjustment branch is connected to a direct current bus midpoint of a direct current power supply.

For descriptions of a DC-to-AC inverter circuit 201, a transmitting coil 202, a direct current power supply 205, a compensation circuit 206, and a controller (not shown in FIG. 11), refer to Apparatus Embodiment 1, and details are not described herein again.

An impedance adjustment circuit 1003 includes a first inductive branch and a second inductive branch. The two inductive branches are connected in parallel to form an adjustment branch, and a first end of the adjustment branch is connected to a direct current bus midpoint at an output end of the direct current power supply.

Apparatus Embodiment 6

In a wireless charging transmitting apparatus provided in this embodiment, when a first end of an adjustment branch is connected to a direct current bus midpoint at an output end of a direct current power supply, an impedance adjustment branch of the wireless charging transmitting apparatus further includes a first DC blocking capacitor, and the first end of the adjustment branch is connected to the direct current bus midpoint at the output end of the power supply by using the first DC blocking capacitor. The following provides specific descriptions with reference to the accompanying drawings.

Figure 12:
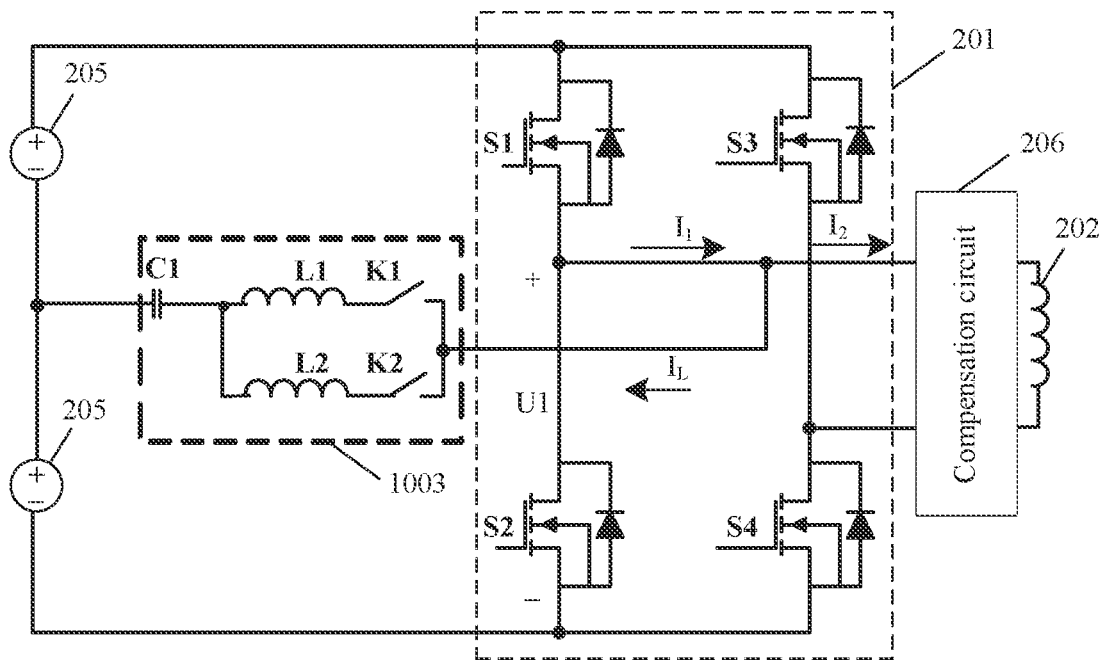
FIG. 12 is a circuit diagram of another wireless charging transmitting apparatus according to Apparatus Embodiment 6 of this application.

FIG. 12 is a circuit diagram of another wireless charging transmitting apparatus according to Apparatus Embodiment 6 of this application.

For descriptions of a DC-to-AC inverter circuit 201, a transmitting coil 202, a direct current power supply 205, a compensation circuit 206, and a controller (not shown in FIG. 12), refer to Apparatus Embodiment 1, and details are not described herein again.

An impedance adjustment circuit 1003 includes a first inductive branch and a second inductive branch, where the first inductive branch includes a first inductor L1 and a first switch K1 that are connected in series, and the second inductive branch includes a second inductor L2 and a second switch K2 that are connected in series. The first inductive branch and the second inductive branch are connected in parallel to form an adjustment branch, and a first end of the adjustment branch is connected to a direct current bus midpoint of the direct current power supply 205 by using a first DC blocking capacitor C1.

It may be understood that a diode clamp circuit including a first diode and a second diode may be further added to at least one of the inductive branches. For details, refer to related descriptions in Apparatus Embodiment 2, and details are not described herein again.

Referring to the descriptions in Apparatus Embodiment 1, to enable the controllable switching transistor of the lagging bridge arm to implement ZVS, a phase of a current in the lagging bridge arm needs to lag behind a phase of the output voltage in the DC-to-AC inverter circuit 201. An appropriate inductive current is injected into the lagging bridge arm by using the inductive branch, so that the phase of the current in the lagging bridge arm keeps lagging behind the phase of the output voltage in the lagging bridge arm of the DC-to-AC inverter circuit 201. However, a direct current component in the inductive branch is also injected into the lagging bridge arm. The direct current component increases a valid value of the current in the lagging bridge arm, and further increases a conduction loss and a switching loss of the controllable switching transistor of the lagging bridge arm. Therefore, in the wireless charging transmitting apparatus provided in this embodiment of this application, the first DC blocking capacitor is added to the impedance adjustment circuit, and the first end of the adjustment branch is connected to the direct current bus midpoint by using the first DC blocking capacitor. This can filter out the direct current component in the adjustment branch, reduce an increment of an rms current in the lagging bridge arm, and reduce a conduction loss and a switching loss of the controllable switching transistor of the lagging bridge arm.

Apparatus Embodiment 7

In a wireless charging transmitting apparatus provided in this embodiment of this application, when a first end of an adjustment branch is connected to a positive direct current bus at an output end of a direct current power supply, an impedance adjustment branch of the wireless charging transmitting apparatus further includes a second DC blocking capacitor, and the first end of the adjustment branch is connected to the positive direct current bus at the output end of the power supply by using the second DC blocking capacitor. The following provides specific descriptions with reference to the accompanying drawings.

Figure 13:
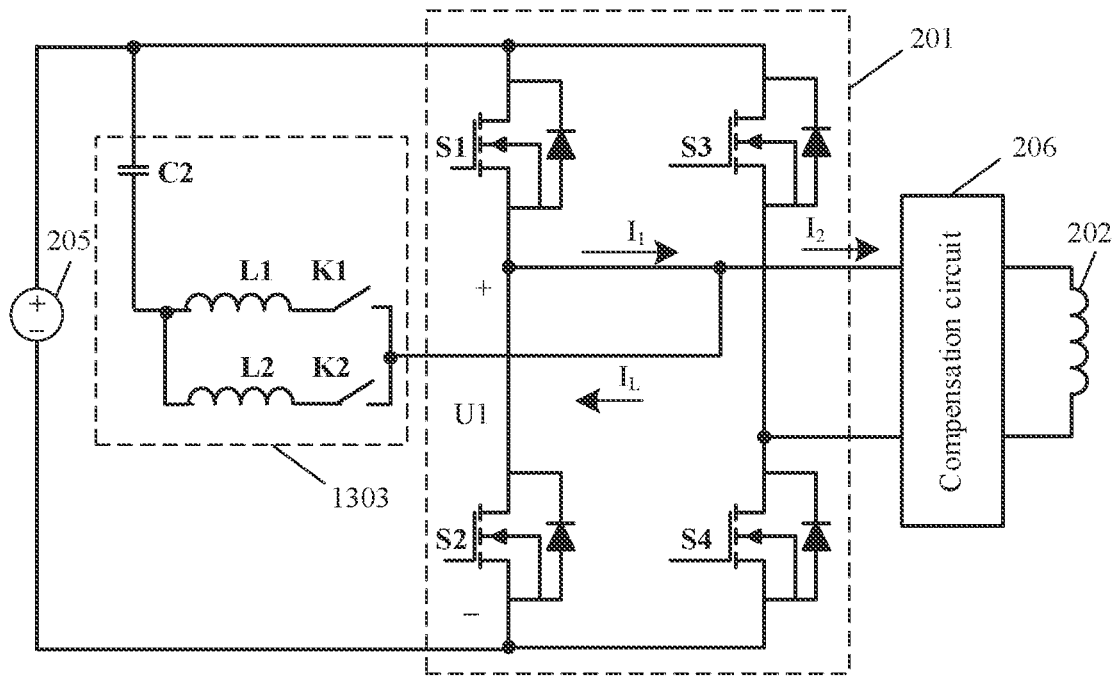
FIG. 13 is a circuit diagram of still another wireless charging transmitting apparatus according to Apparatus Embodiment 7 of this application.

FIG. 13 is a circuit diagram of still another wireless charging transmitting apparatus according to Apparatus Embodiment 7 of this application.

For descriptions of a DC-to-AC inverter circuit 201, a transmitting coil 202, a direct current power supply 205, a compensation circuit 206, and a controller (not shown in FIG. 13), refer to Apparatus Embodiment 1, and details are not described herein again.

An impedance adjustment circuit 1303 includes a first inductive branch and a second inductive branch, where the first inductive branch includes a first inductor L1 and a first switch K1 that are connected in series, and the second inductive branch includes a second inductor L2 and a second switch K2 that are connected in series. The first inductive branch and the second inductive branch are connected in parallel to form an adjustment branch, and a first end of the adjustment branch is connected to a positive direct current bus of the direct current power supply 205 by using a second DC blocking capacitor C2.

It may be understood that a first diode and a second diode may further be added to the at least one inductive branch to form a diode clamp circuit. For details, refer to Apparatus Embodiment 2, and details are not described herein again.

To enable the controllable switching transistor of the lagging bridge arm to implement ZVS, a phase of a current in the lagging bridge arm needs to lag behind a phase of the output voltage in the DC-to-AC inverter circuit 201. An appropriate inductive current is injected into the lagging bridge arm by using the inductive branch, so that the phase of the current in the lagging bridge arm keeps lagging behind the phase of the output voltage in the lagging bridge arm of the DC-to-AC inverter circuit 201. However, a direct current component in the inductive branch is also injected into the lagging bridge arm. The direct current component increases a valid value of the current in the lagging bridge arm, and further increases a conduction loss and a switching loss of the controllable switching transistor of the lagging bridge arm. In the wireless charging transmitting apparatus provided in this embodiment of this application, the second DC blocking capacitor is added to the impedance adjustment circuit, and the first end of the adjustment branch is connected to the positive direct current bus at the output end of the direct current power supply by using the second DC blocking capacitor. This can filter out the direct current component in the adjustment branch, reduce an increment of an rms current in the lagging bridge arm, and reduce a conduction loss and a switching loss of the controllable switching transistor of the lagging bridge arm.

Apparatus Embodiment 8

In a wireless charging transmitting apparatus provided in this embodiment of this application, when a first end of an adjustment branch is connected to a negative direct current bus at an output end of a direct current power supply, an impedance adjustment branch of the wireless charging transmitting apparatus further includes a third DC blocking capacitor, and the first end of the adjustment branch is connected to the negative direct current bus at the output end of the power supply by using the third DC blocking capacitor. The following provides specific descriptions with reference to the accompanying drawings.

Figure 14:
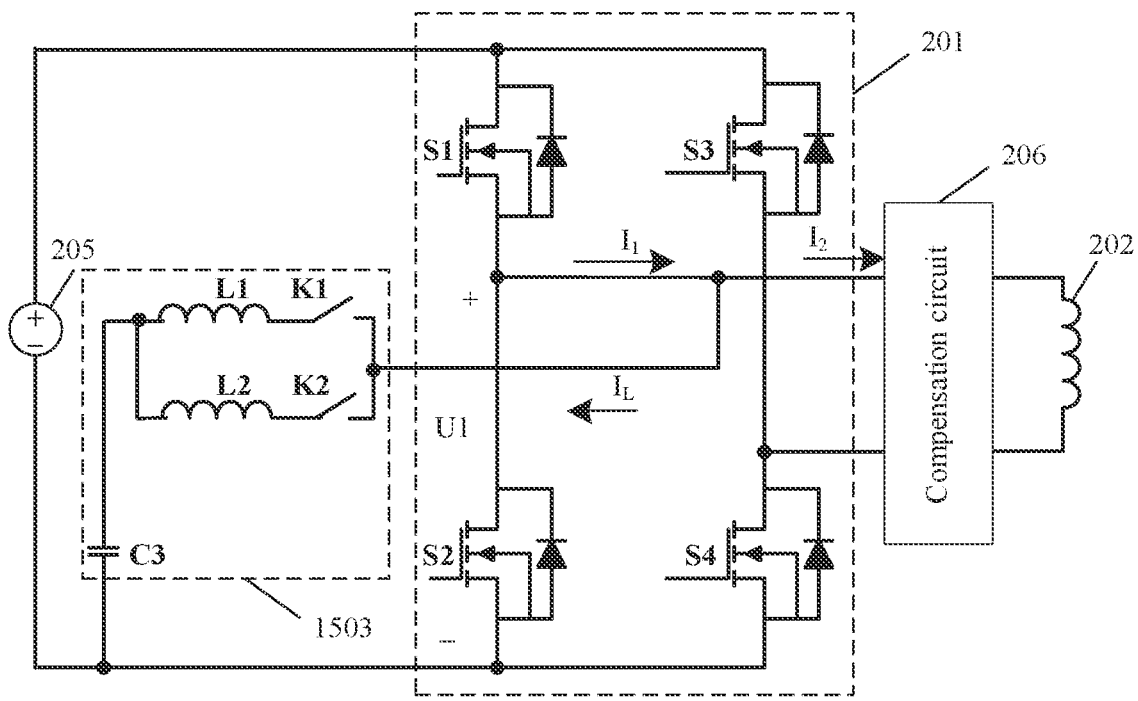
FIG. 14 is a circuit diagram of yet another wireless charging transmitting apparatus according to Apparatus Embodiment 8 of this application.

FIG. 14 is a circuit diagram of yet another wireless charging transmitting apparatus according to Apparatus Embodiment 8 of this application.

For descriptions of a DC-to-AC inverter circuit 201, a transmitting coil 202, a direct current power supply 205, a compensation circuit 206, and a controller (not shown in FIG. 14), refer to Apparatus Embodiment 1, and details are not described herein again.

An impedance adjustment circuit 1503 includes a first inductive branch and a second inductive branch, where the first inductive branch includes a first inductor L1 and a first switch K1 that are connected in series, and the second inductive branch includes a second inductor L2 and a second switch K2 that are connected in series. The first inductive branch and the second inductive branch are connected in parallel to form an adjustment branch, and a first end of the adjustment branch is connected to a negative direct current bus of the direct current power supply 205 by using a third DC blocking capacitor C3.

It may be understood that a first diode and a second diode may further be added to the at least one inductive branch to form a diode clamp circuit. For details, refer to Apparatus Embodiment 2, and details are not described herein again.

To enable the controllable switching transistor of the lagging bridge arm to implement ZVS, a phase of a current in the lagging bridge arm needs to lag behind a phase of the output voltage in the DC-to-AC inverter circuit 201. An appropriate inductive current is injected into the lagging bridge arm by using the inductive branch, so that the phase of the current in the lagging bridge arm keeps lagging behind the phase of the output voltage in the lagging bridge arm of the DC-to-AC inverter circuit 201. However, a direct current component in the inductive branch is also injected into the lagging bridge arm. The direct current component increases a valid value of the current in the lagging bridge arm, and further increases a conduction loss and a switching loss of the controllable switching transistor of the lagging bridge arm. In the wireless charging transmitting apparatus provided in this embodiment of this application, the third DC blocking capacitor is added to the impedance adjustment circuit, and the first end of the adjustment branch is connected to the negative direct current bus at the output end of the direct current power supply by using the third DC blocking capacitor. This can filter out the direct current component in the adjustment branch, reduce an increment of an rms current in the lagging bridge arm, and reduce a conduction loss and a switching loss of the controllable switching transistor of the lagging bridge arm.

Apparatus Embodiment 9

This embodiment of this application further provides a wireless charging transmitting apparatus, where an impedance adjustment branch of the wireless charging transmitting apparatus includes both a second DC blocking capacitor and a third DC blocking capacitor, a first end of an adjustment branch is connected to the positive direct current bus at an output end of a power supply by using the second DC blocking capacitor, and the first end of the adjustment branch is further connected to a negative direct current bus at the output end of the power supply by using the third DC blocking capacitor. In this way, the impedance adjustment circuit can be connected to the direct current power supply that has no direct current bus. The following provides specific descriptions with reference to the accompanying drawings.

Figure 15:
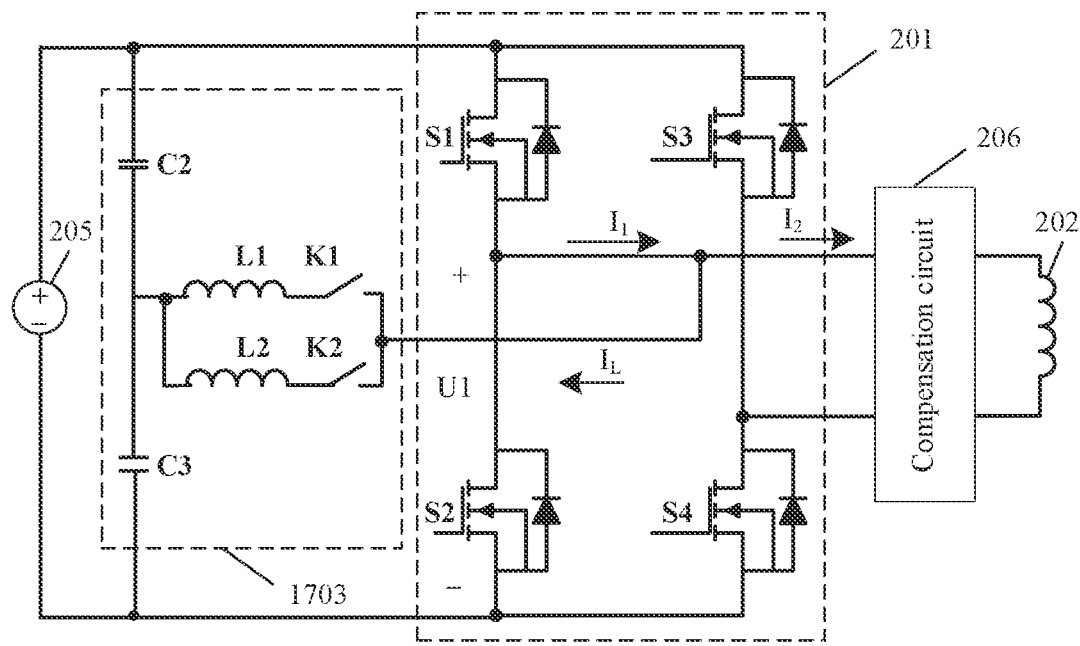
FIG. 15 is a circuit diagram of still yet another wireless charging transmitting apparatus according to Apparatus Embodiment 9 of this application.

FIG. 15 is a circuit diagram of another wireless charging transmitting apparatus according to Apparatus Embodiment 9 of this application.

For descriptions of a DC-to-AC inverter circuit 201, a transmitting coil 202, a direct current power supply 205, a compensation circuit 206, and a controller (not shown in FIG. 15), refer to Apparatus Embodiment 1, and details are not described herein again.

An impedance adjustment circuit 1703 includes a first inductive branch and a second inductive branch, where the first inductive branch includes a first inductor L1 and a first switch K1 that are connected in series, and the second inductive branch includes a second inductor L2 and a second switch K2 that are connected in series. The first inductive branch and the second inductive branch are connected in parallel to form an adjustment branch, a first end of the adjustment branch is connected to a positive direct current bus of the direct current power supply 205 by using a second DC blocking capacitor C2, and the first end of the adjustment branch is further connected to a negative direct current bus of the direct current power supply 205 by using a third DC blocking capacitor C3.

It may be understood that a first diode and a second diode may further be added to the at least one inductive branch to form a diode clamp circuit. For details, refer to Apparatus Embodiment 2, and details are not described herein again.

To enable the controllable switching transistor of the lagging bridge arm to implement ZVS, a phase of a current in the lagging bridge arm needs to lag behind a phase of the output voltage in the DC-to-AC inverter circuit 201. An appropriate inductive current is injected into the lagging bridge arm by using the inductive branch, so that the phase of the current in the lagging bridge arm keeps lagging behind the phase of the output voltage in the lagging bridge arm of the DC-to-AC inverter circuit 201. However, a direct current component in the inductive branch is also injected into the lagging bridge arm. The direct current component increases a valid value of the current in the lagging bridge arm, and further increases a conduction loss and a switching loss of the controllable switching transistor of the lagging bridge arm. In the wireless charging transmitting apparatus provided in this embodiment of this application, the second DC blocking capacitor and the third DC blocking capacitor are added to the impedance adjustment circuit, the first end of the adjustment branch is connected to the positive direct current bus at the output end of the power supply by using the second DC blocking capacitor, and the first end of the adjustment branch is connected to the negative direct current bus at the output end of the direct current power supply by using the third DC blocking capacitor. In this way, the impedance adjustment circuit can be connected to the direct current power supply that has no direct current bus. Further, the direct current component in the adjustment branch can be filtered out, an increment of an rms current in the lagging bridge arm can be reduced, and a conduction loss and a switching loss of the controllable switching transistor of the lagging bridge arm can be reduced.

Apparatus Embodiment 10

In a wireless charging transmitting apparatus provided in this embodiment of this application, when a first end of an adjustment branch is connected to a direct current bus midpoint at an output end of a direct current power supply, an impedance adjustment branch of the wireless charging transmitting apparatus further includes a third DC blocking capacitor, and the first end of the adjustment branch is connected to the direct current bus midpoint at the output end of the power supply by using the third DC blocking capacitor. The following provides specific descriptions with reference to the accompanying drawings.

Figure 16:
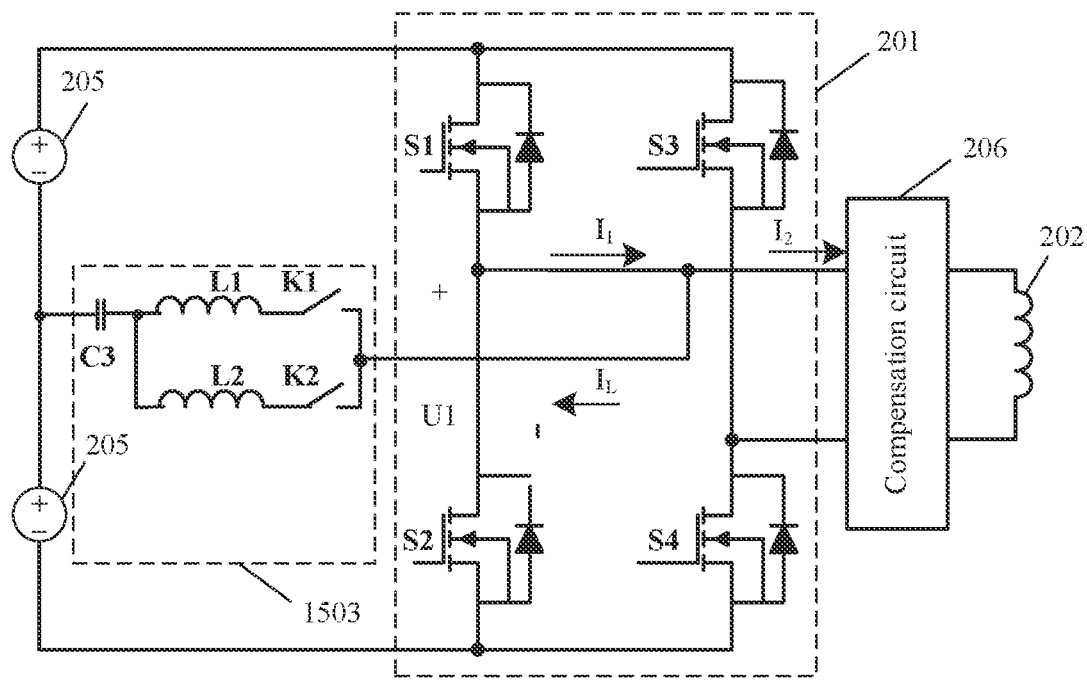
FIG. 16 is a circuit diagram of a further wireless charging transmitting apparatus according to Apparatus Embodiment 10 of this application.

FIG. 16 is a circuit diagram of yet another wireless charging transmitting apparatus according to Apparatus Embodiment 10 of this application.

For descriptions of a DC-to-AC inverter circuit 201, a transmitting coil 202, a direct current power supply 205, a compensation circuit 206, and a controller (not shown in FIG. 16), refer to Apparatus Embodiment 1, and details are not described herein again.

An impedance adjustment circuit 1503 includes a first inductive branch and a second inductive branch, where the first inductive branch includes a first inductor L1 and a first switch K1 that are connected in series, and the second inductive branch includes a second inductor L2 and a second switch K2 that are connected in series. The first inductive branch and the second inductive branch are connected in parallel to form an adjustment branch, and a first end of the adjustment branch is connected to a direct current bus midpoint of the direct current power supply 205 by using a third DC blocking capacitor C3.

It may be understood that a first diode and a second diode may further be added to the at least one inductive branch to form a diode clamp circuit. For details, refer to Apparatus Embodiment 2, and details are not described herein again.

To enable the controllable switching transistor of the lagging bridge arm to implement ZVS, a phase of a current in the lagging bridge arm needs to lag behind a phase of the output voltage in the DC-to-AC inverter circuit 201. An appropriate inductive current is injected into the lagging bridge arm by using the inductive branch, so that the phase of the current in the lagging bridge arm keeps lagging behind the phase of the output voltage in the lagging bridge arm of the DC-to-AC inverter circuit 201. However, a direct current component in the inductive branch is also injected into the lagging bridge arm. The direct current component increases a valid value of the current in the lagging bridge arm, and further increases a conduction loss and a switching loss of the controllable switching transistor of the lagging bridge arm. In the wireless charging transmitting apparatus provided in this embodiment of this application, the third DC blocking capacitor is added to the impedance adjustment circuit, and the first end of the adjustment branch is connected to the negative direct current bus at the output end of the direct current power supply by using the third DC blocking capacitor. This can filter out the direct current component in the adjustment branch, reduce an increment of an rms current in the lagging bridge arm, and reduce a conduction loss and a switching loss of the controllable switching transistor of the lagging bridge arm.

Method Embodiment

An embodiment of this application further provides a wireless charging control method, applied to the wireless charging transmitting apparatuses described in the foregoing embodiments. The wireless charging transmitting apparatuses each include a DC-to-AC inverter circuit, a transmitting coil, an impedance adjustment circuit, and a controller. The DC-to-AC inverter circuit is configured to invert a direct current output by a direct current power supply to an alternating current, the DC-to-AC inverter circuit includes an advancing bridge arm and a lagging bridge arm, and in one period, a voltage phase of the advancing bridge arm precedes a voltage phase of the lagging bridge arm. The transmitting coil is configured to: receive the alternating current and generate an alternating current magnetic field. The impedance adjustment circuit includes at least one inductive branch, where each inductive branch includes an inductor and a switch that are connected in series, all inductive branches are connected in parallel to form an adjustment branch, a first end of the adjustment branch is connected to an output port of the direct current power supply, and a second end of the adjustment branch is connected to a midpoint of the lagging bridge arm.

For specific descriptions of the wireless charging transmitting apparatuses, refer to the foregoing embodiments of the wireless charging transmitting apparatuses, and details are not described herein again.

The method provided in this embodiment of this application includes the following steps.

Controlling on or off of the switch in the inductive branch to change a current flowing out of the lagging bridge arm, so that a controllable switching transistor of the lagging bridge arm implements ZVS.

Figure 17:
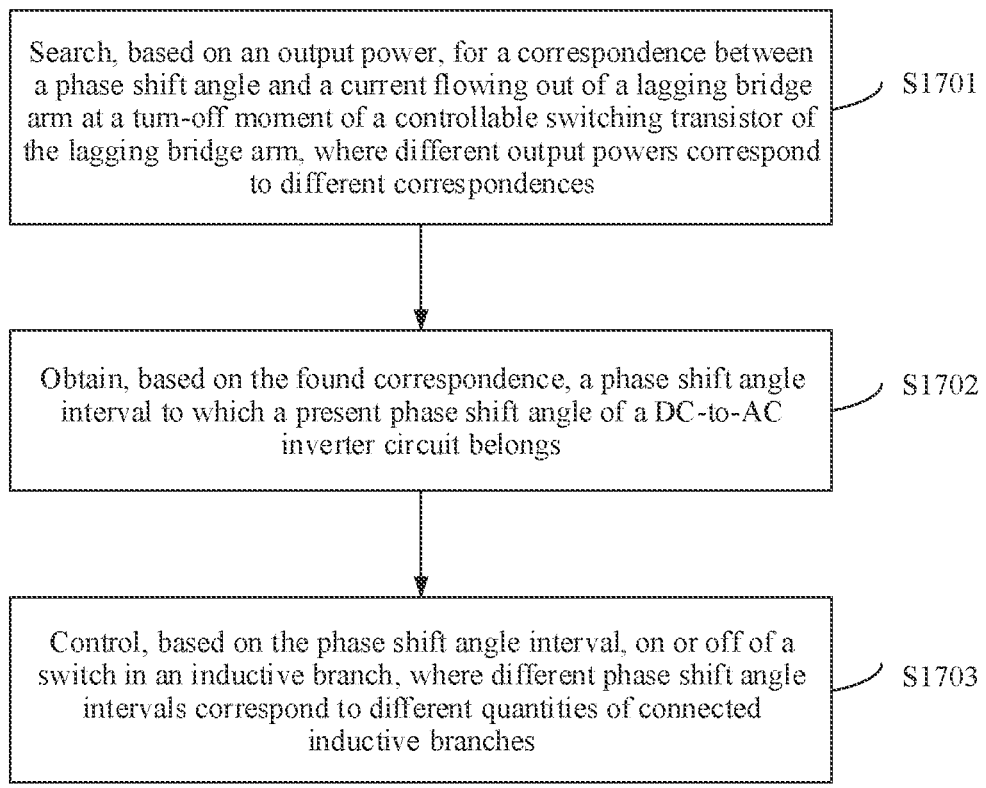
FIG. 17 is a flowchart of a wireless charging control method according to an embodiment of this application.

The controller may specifically control connectivity of the inductive branch in the following two manners:

First Manner:

The controller controls on or off of the switch in the inductive branch based on a present phase shift angle and a present output power of the DC-to-AC inverter circuit, where the phase shift angle is a phase difference between a midpoint voltage of the advancing bridge arm and a midpoint voltage of the lagging bridge arm. As shown in FIG. 17, the first manner includes the following steps:

S1701: Search, based on the output power, for a correspondence between the phase shift angle and a current flowing out of a lagging bridge arm at a turn-off moment of a controllable switching transistor of the lagging bridge arm, where different output powers correspond to different correspondences.

S1702: Obtain, based on the found correspondence, a phase shift angle interval to which the present phase shift angle of the DC-to-AC inverter circuit belongs.

S1703: Control, based on the phase shift angle interval, on or off of the switch in the inductive branch, where different phase shift angle intervals correspond to different quantities of connected inductive branches.

After the output power of the DC-to-AC inverter circuit is determined, the correspondence between the phase shift angle corresponding to the output power and the current flowing out of the lagging bridge arm is searched for. A quantity of inductive branches that match the present phase shift angle may be determined based on the phase shift angle interval to which the present phase shift angle belongs. The controller controls on or off of switches in the determined quantity of inductive branches, to inject an abundant supply of inductive currents into the midpoint of the lagging bridge arm, so that the controllable switching transistor of the lagging bridge arm implements ZVS.

Second Manner:

The controller controls on or off of the switch in the inductive branch based on a current flowing into the compensation circuit or a current flowing out of the lagging bridge arm at a turn-off moment of the controllable switching transistor of the lagging bridge arm.

That the controller controls on or off of the switch in the inductive branch based on a current flowing into the compensation circuit at a turn-off moment of the controllable switching transistor of the lagging bridge arm is specifically:

obtaining a difference between the current flowing into the compensation circuit at the turn-off moment of the controllable switching transistor of the lagging bridge arm and a preset current, and controlling on and off of the switch in the inductive branch based on the difference, where different differences correspond to different quantities of closed inductive branches.

That the controller controls on or off of the switch in the inductive branch based on a current flowing out of the lagging bridge arm is specifically:

obtaining a current flowing into the compensation circuit, based on the current flowing out of the lagging bridge arm at the turn-off moment of the controllable switching transistor of the lagging bridge arm and a present quantity of closed inductive branches, obtaining a difference between the current flowing into the compensation circuit and a preset current, and controlling on and off of the switch in the inductive branch based on the difference, where different differences correspond to different quantities of closed inductive branches.

Referring to the circuit diagram shown in FIG. 5a, a current flowing out of the lagging bridge arm being defined to be positive and a moment at which S2 is turned off are used as an example for analysis. A current flowing out of the lagging bridge arm is detected. When the current flowing out of the lagging bridge arm is greater than a preset current value (which is usually a small negative value), a quantity of closed inductive branches increases, that is, an inductance value of an inductor connected to the midpoint of the lagging bridge arm is decreased.

According to the wireless charging control method provided in this application, the controller is configured to control on or off of the switch in the inductive branch to change a current flowing out of the lagging bridge arm. To be specific, the controller controls a magnitude of a current injected into the lagging bridge arm by controlling a quantity of connected inductive branches, so that a controllable switching transistor of the lagging bridge arm implements ZVS. The controller controls the inductive branch to connect to the lagging bridge arm only when an inductive current needs to be injected into the lagging bridge arm. When the adjustment branch includes a plurality of inductive branches connected in parallel, the controller may control on/off of a switch in each inductive branch, so that the impedance adjustment circuit presents different inductances. Different magnitudes of an inductance in the impedance adjustment circuit indicate different inductive currents injected into the lagging bridge arm. A process in which the controller switches the inductive branch does not affect power transmission of a wireless charging transmitting apparatus, and stability and reliability of the wireless charging transmitting apparatus are improved.

System Embodiment

Based on the wireless charging transmitting apparatuses provided in the foregoing embodiments, an embodiment of this application further provides a wireless charging system. The following provides specific descriptions with reference to the accompanying drawings.

Figure 18:
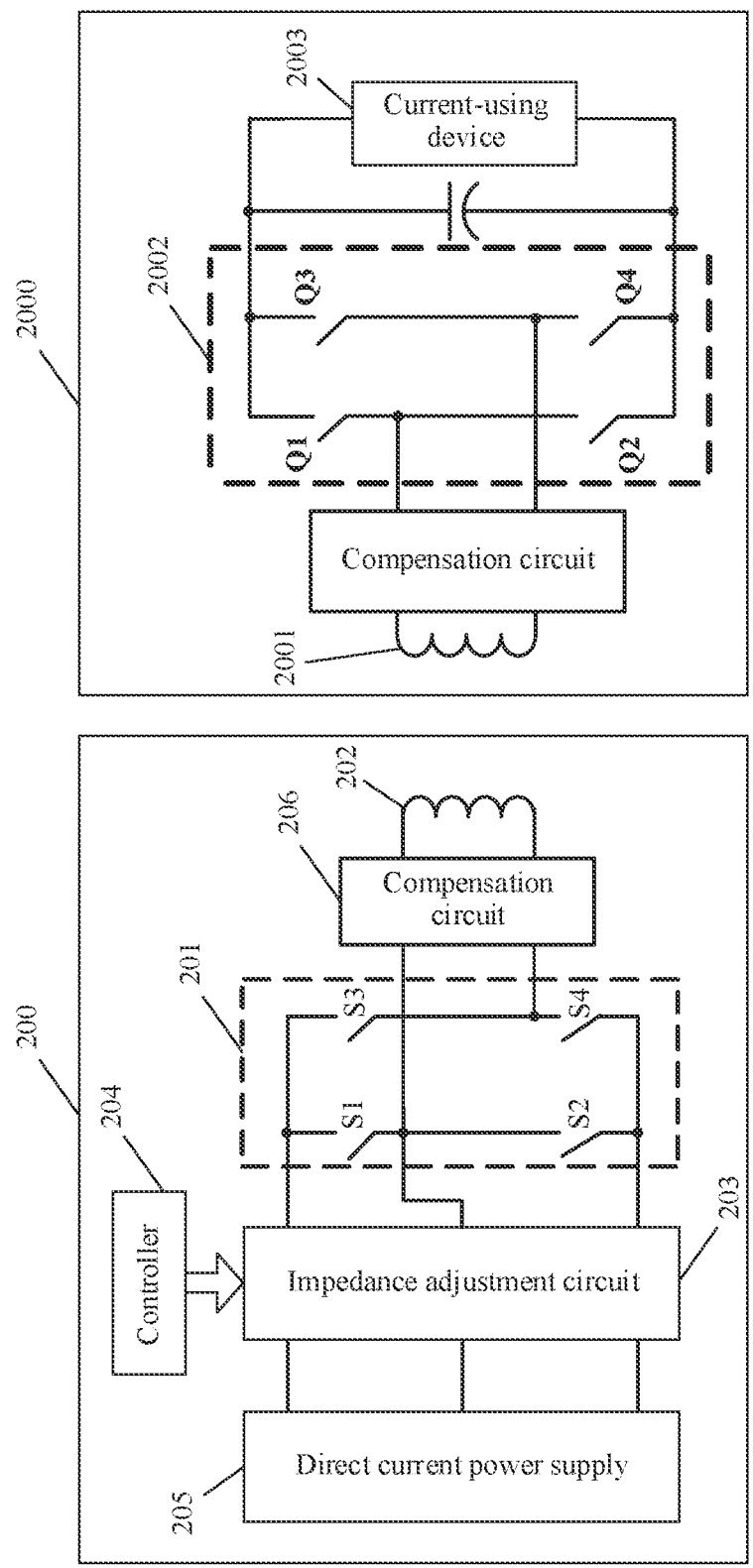
FIG. 18 is a schematic diagram of a wireless charging system according to an embodiment of this application.

FIG. 18 is a schematic diagram of a wireless charging system according to an embodiment of this application.

The system includes: a wireless charging transmitting apparatus 200 and a wireless charging receiving apparatus 2000.

The wireless charging transmitting apparatus 200 may be any one provided in the foregoing apparatus embodiments. The wireless charging transmitting apparatus 200 includes at least a DC-to-AC inverter circuit 201, a transmitting coil 202, an impedance adjustment circuit 203, and a controller 204.

The wireless charging receiving apparatus 2000 is configured to: receive an alternating current magnetic field transmitted by the wireless charging transmitting apparatus, convert the alternating current magnetic field into a direct current, and provide the direct current for a current-using device. The wireless charging receiving apparatus 2000 specifically includes a coil 2001, a rectifier 2002, and the current-using device 2003.

The DC-to-AC inverter circuit 201 inverts the direct current output by the direct current power supply 205 into an alternating current, the DC-to-AC inverter circuit 201 includes an advancing bridge arm and a lagging bridge arm, and a voltage phase of the advancing bridge arm precedes a voltage phase of the lagging bridge arm.

The transmitting coil 202 transmits the alternating current in an alternating current magnetic field.

The impedance adjustment circuit 203 includes at least one inductive branch, where each inductive branch includes an inductor and a switch that are connected in series, all inductive branches are connected in parallel to form an adjustment branch, a first end of the adjustment branch is connected to an output port of the direct current power supply 205, and a second end of the adjustment branch is connected to a midpoint of the lagging bridge arm. The adjustment branch is connected to the midpoint of the lagging bridge arm, so that an inductive current can be injected into the lagging bridge arm, to increase an inductive current component in the lagging bridge arm.

The controller 204 is configured to control an on/off state of a switch in the inductive branch based on a phase shift angle, where the phase shift angle is a phase difference between a midpoint voltage of the advancing bridge arm and a midpoint voltage of the lagging bridge arm.

The receiving coil 2001 receives, in an alternating current magnetic field, electromagnetic energy emitted by the transmitting coil 202.

The rectifier 2002 is configured to rectify an alternating current output by the receiving coil 2001 into a direct current and output the direct current to the current-using device.

The wireless charging transmitting apparatus in the wireless charging system additionally includes the impedance adjustment circuit and the controller. The impedance adjustment circuit includes at least one inductive branch, each inductive branch includes an inductor and a switch that are connected in series, all inductive branches are connected in parallel to form the adjustment branch, the first end of the adjustment branch is connected to the output port of the direct current power supply, and the second end of the adjustment branch is connected to the midpoint of the lagging bridge arm. An inductive current may be injected into the lagging bridge arm as required, to increase an inductive current component in the lagging bridge arm. When the phase shift angle is relatively large the DC-to-AC inverter circuit can implement ZVS of the controllable switching transistor. When the phase shift angle is relatively small, the DC-to-AC inverter circuit cannot implement ZVS of the controllable switching transistor. Therefore, a measure needs to be taken so that the controllable switching transistor of the DC-to-AC inverter circuit implements ZVS. The wireless charging transmitting apparatus provided in this embodiment of this application controls the inductive branch to connect to the lagging bridge arm only when the inductive current needs to be injected into the lagging bridge arm.

When the adjustment branch includes one inductive branch, the controller may determine, based on the phase shift angle, whether the inductive branch is to be connected to the midpoint of the lagging bridge arm, to be specific, control the inductive branch to connect to the midpoint of the lagging bridge arm when a switch in the inductive branch is closed. Then, an inductive current is injected into the lagging bridge arm.

When the adjustment branch includes a plurality of inductive branches connected in parallel, the controller may control on/off of a switch in each inductive branch, so that the impedance adjustment circuit presents different inductances. Different magnitudes of an inductance in the impedance adjustment circuit indicate different inductive currents injected into the lagging bridge arm. When the phase shift angle is relatively small, for different phase shift angles, the controller may control, by controlling a quantity of connected inductive branches, a magnitude of a current injected into the lagging bridge arm, to implement matching between the injected inductive current and the phase shift angle, and avoid an increase in power consumption caused by an excessive quantity of connected inductors.

According to the wireless charging transmitting apparatus in the wireless charging system, the controller is configured to control on or off of the switch in the inductive branch to change a current flowing out of the lagging bridge arm. To be specific, the controller controls a magnitude of a current injected into the lagging bridge arm by controlling a quantity of connected inductive branches, so that a controllable switching transistor of the lagging bridge arm implements ZVS. The controller controls the inductive branch to connect to the lagging bridge arm only when an inductive current needs to be injected into the lagging bridge arm. When the adjustment branch includes a plurality of inductive branches connected in parallel, the controller may control on/off of a switch in each inductive branch, so that the impedance adjustment circuit presents different inductances. Different magnitudes of an inductance in the impedance adjustment circuit indicate different inductive currents injected into the lagging bridge arm. A process in which the controller switches the inductive branch does not affect power transmission of the wireless charging transmitting apparatus, and stability and reliability of the wireless charging transmitting apparatus are improved.

Device Embodiment

Based on the wireless charging transmitting apparatus and the control method provided in the foregoing embodiments, an embodiment of this application further provides a current-using device. The following provides specific descriptions with reference to the accompanying drawings.

Figure 19:
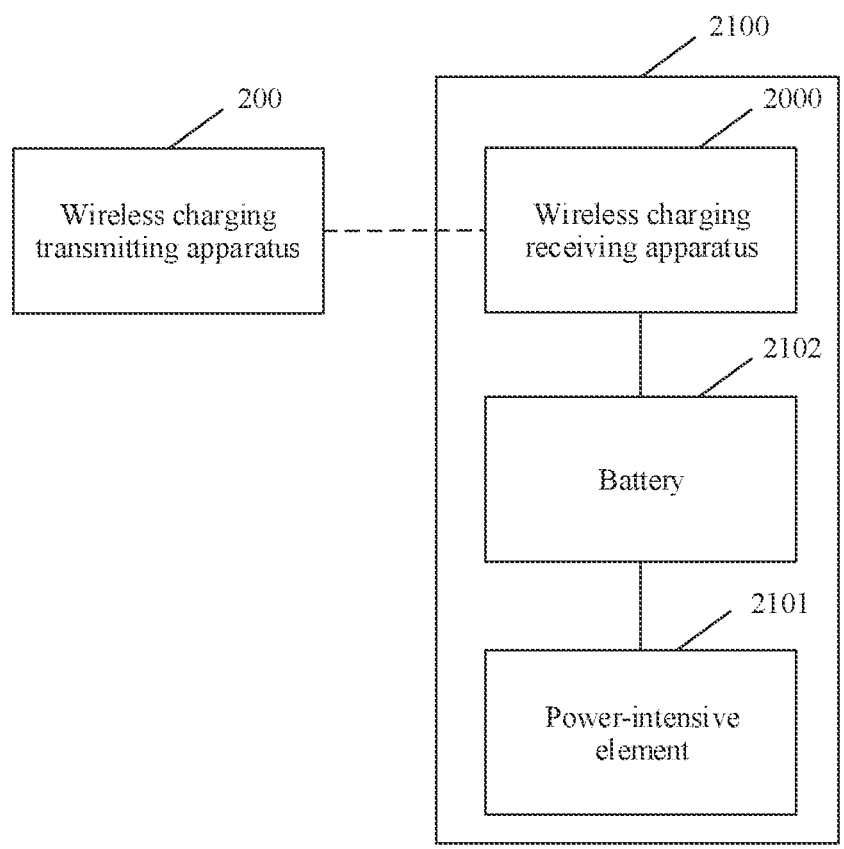
FIG. 19 is a schematic diagram of a current-using device according to an embodiment of this application.

FIG. 19 is a schematic diagram of a current-using device according to an embodiment of this application.

The current-using device 2100 includes a power-intensive element 2101, a battery 2102, and a wireless charging receiving apparatus 2000.

The wireless charging receiving apparatus 2000 is configured to receive an alternating current magnetic field transmitted by a wireless charging transmitting apparatus 200, and is further configured to convert the alternating current magnetic field into a direct current, to charge the battery 2102.

The battery 2102 is configured to supply power to the power-intensive element 2101.

The current-using device may be the electric vehicle shown in FIG. 2a. The current-using device was wirelessly charged by using the wireless charging transmitting apparatus provided in this application. The wireless charging transmitting apparatus can implement ZVS under different phase shift angles, and can adjust the phase shift angle online (during live working) to adapt to different conditions such as a coupling coefficient, an output voltage, an output current, and a target power. This avoids an interruption of power transmission of the wireless charging transmitting apparatus, and improves stability and safety of the current-using device in a wireless charging process.

Words such as "first" and "second" in the foregoing embodiments are merely used for ease of explanation and description, and do not constitute a limitation on this application.

It should be understood that in this application. "at least one (item)" refers to one or more, and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following" or a similar expression thereof indicates any combination of the items, including any combination of one or more of the items. For example, at least one of a, b, or c may indicate a, b, c, "a and b", "a and c", "b and c", or "a, b, and c", where a, b, and c may be singular or plural.

Disclosed above are merely exemplary embodiments of the present invention, but are not intended to limit any form of the present invention. Although the present invention has been disclosed above with the exemplary embodiments, the exemplary embodiments are not used to prescribe a limit on the present invention. Any person of technical skills in the art, under a circumstance without departing from the technical solutions scope of the present invention, may make a number of possible variations and modifications to the present invention by using the foregoing disclosed methods and technical content, or amend the content into an embodiment that is equivalent to variation and is with equivalent effectiveness. Therefore, any simple amendments, equivalent variations and modifications that are made to the foregoing embodiments according to technical essence of the present invention without departing from the content of the technical solutions of the present invention fall within the protection scope of the technical solutions of the present invention.

What is claimed is:

1. An apparatus for wireless charging, comprising:
a direct current to alternating current (DC-to-AC) inverter circuit configured to invert a DC output by a DC power supply to an AC, wherein the DC-to-AC inverter circuit comprises an advancing bridge arm and a lagging bridge arm, and wherein a voltage phase of the advancing bridge arm precedes a voltage phase of the lagging bridge arm in a same period;

a compensation circuit configured to compensate the AC output by the DC-to-AC inverter circuit and send the AC obtained after compensation to a transmitting coil;
the transmitting coil configured to receive the AC and generate an AC magnetic field;
an impedance adjustment circuit comprising one or more inductive branches, each of the one or more inductive branches comprises an inductor and a switch that are connected in series, the one or more inductive branches form an adjustment branch, a first end of the adjustment branch is connected to an output port of the DC power supply, and a second end of the adjustment branch is connected to a midpoint of the lagging bridge arm; and
a controller configured to control on or off of the switch in each corresponding inductive branch of the one or more inductive branches to change a current flowing out of the lagging bridge arm to enable a controllable switching transistor of the lagging bridge arm to implement zero-voltage switching.

2. The apparatus according to claim 1, wherein the on or off of the switch in the corresponding inductive branch is controlled based on a phase shift angle and an output power of the DC-to-AC inverter circuit, and wherein the phase shift angle is a phase difference between a midpoint voltage of the advancing bridge arm and a midpoint voltage of the lagging bridge arm.

3. The apparatus according to claim 2, wherein the controller is further configured to:
identify, based on the output power, a correspondence between the phase shift angle and the current flowing out of the lagging bridge arm at a turn-off moment of the controllable switching transistor of the lagging bridge arm from a plurality of correspondences corresponding to a plurality of output powers;
obtain, based on the identified correspondence, a phase shift angle interval to which the phase shift angle of the DC-to-AC inverter circuit belongs; and
control, based on the phase shift angle interval, the on or off of the switch in the corresponding inductive branch, wherein different phase shift angle intervals correspond to different quantities of connected inductive branches.

4. The apparatus according to claim 1, wherein the controller is further configured to control the on or off of the switch in the corresponding inductive branch based on a current flowing into the compensation circuit or the current flowing out of the lagging bridge arm at a turn-off moment of the controllable switching transistor of the lagging bridge arm.

5. The apparatus according to claim 4, wherein the controller is further configured to:
determine a difference between the current flowing into the compensation circuit at the turn-off moment of the controllable switching transistor of the lagging bridge arm and a preset current; and
control the on or off of the switch in the corresponding inductive branch based on the difference, wherein different differences correspond to different quantities of closed inductive branches.

6. The apparatus according to claim 4, wherein the controller is further configured to:
obtain the current flowing into the compensation circuit, based on the current flowing out of the lagging bridge arm at the turn-off moment of the controllable switching transistor of the lagging bridge arm and a present quantity of closed inductive branches;
determine a difference between the current flowing into the compensation circuit and a preset current; and
control on or off of the switch in the corresponding inductive branch based on the difference, wherein different differences correspond to different quantities of closed inductive branches.

7. The apparatus according to claim 1, wherein the first end of the adjustment branch is connected to at least one of a positive DC bus, a negative DC bus, or a DC bus midpoint at an output end of the DC power supply.

8. The apparatus according to claim 7, wherein the impedance adjustment circuit further comprises a first DC blocking capacitor, and the first end of the adjustment branch is connected to the DC bus midpoint through the first DC blocking capacitor.

9. The apparatus according to claim 7, wherein the impedance adjustment circuit further comprises a second DC blocking capacitor, and the first end of the adjustment branch is connected to the positive DC bus through the second DC blocking capacitor.

10. The apparatus according to claim 7, wherein the impedance adjustment circuit further comprises a third DC blocking capacitor, and the first end of the adjustment branch is connected to the negative DC bus through the third DC blocking capacitor.

11. The apparatus according to claim 7, wherein the one or more inductive branches comprise a first diode and a second diode, an anode of the first diode is connected to a common end of the inductor and the switch in the corresponding inductive branch, a cathode of the first diode is connected to the positive DC bus, a cathode of the second diode is connected to the common end of the inductor and the switch in the corresponding inductive branch, and an anode of the second diode is connected to the negative DC bus.

12. The apparatus according to claim 1, wherein the impedance adjustment circuit comprises at least a first inductive branch and a second inductive branch;
the first inductive branch comprises a first inductor and a first switch, a first end of the first inductor is connected to the output port of the DC power supply, and a second end of the first inductor is connected to the midpoint of the lagging bridge arm by using the first switch; and
the second inductive branch comprises a second inductor and a second switch, a first end of the second inductor is connected to the output port of the DC power supply, and a second end of the second inductor is connected to the midpoint of the lagging bridge arm by using the second switch.

13. The apparatus of claim 1, wherein the one or more inductive branches comprise at least two inductive branches connected in parallel to form the adjustment branch.

14. A method for wireless charging comprising:
inverting, by a direct current to alternative current (DC-to-AC) inverter circuit of a wireless charging apparatus, a direct current output by a direct current power supply to an AC, the DC-to-AC inverter circuit comprises an advancing bridge arm and a lagging bridge arm, and a voltage phase of the advancing bridge arm precedes a voltage phase of the lagging bridge arm in a same period;
receiving, by a transmitting coil of the wireless charging apparatus, the AC;
generating, by the transmitting coil, an AC magnetic field;
controlling, by a controller of the wireless charging apparatus, on or off of a switch in an inductive branch to change a current flowing out of the lagging bridge arm to enable a controllable switching transistor of the lagging bridge arm to implement zero-voltage switching, wherein the inductive branch is comprised in an impedance adjustment circuit and comprises an inductor and a switch that are connected in series, the inductive branch is connected with other inductive branches comprised in the impedance adjustment circuit in parallel to form an adjustment branch, a first end of the adjustment branch is connected to an output port of the direct current power supply, and a second end of the adjustment branch is connected to a midpoint of the lagging bridge arm.

15. The method according to claim 14, wherein the controlling the on or off of the switch in the inductive branch to change the current flowing out of the lagging bridge arm comprises:
controlling on or off of the switch in the inductive branch is controlled based on a phase shift angle and an output power of the DC-to-AC inverter circuit, and wherein the phase shift angle is a phase difference between a midpoint voltage of the advancing bridge arm and a midpoint voltage of the lagging bridge arm.

16. The method according to claim 15, wherein the controlling the on or off of the switch in the inductive branch based on the phase shift angle and the output power of the DC-to-AC inverter circuit comprises:
identifying, based on the output power, a correspondence between the phase shift angle and the current flowing out of the lagging bridge arm at a turn-off moment of the controllable switching transistor of the lagging bridge arm from a plurality of correspondences corresponding to a plurality of output powers;
obtaining, based on the identified correspondence, a phase shift angle interval to which the phase shift angle of the DC-to-AC inverter circuit belongs; and
controlling, based on the phase shift angle interval, the on or off of the switch in the inductive branch, wherein different phase shift angle intervals correspond to different quantities of connected inductive branches.

17. The method according to claim 14, wherein the controlling the on or off of the switch in the inductive branch to change the current flowing out of the lagging bridge arm comprises:
controlling the on or off of the switch in the inductive branch based on a current flowing into a compensation circuit or the current flowing out of the lagging bridge arm at a turn-off moment of the controllable switching transistor of the lagging bridge arm.

18. The method according to claim 17, wherein the controlling the on or off of the switch in the inductive branch based on the current flowing into the compensation circuit at a turn-off moment of the controllable switching transistor of the lagging bridge arm comprises:
determining a difference between the current flowing into the compensation circuit at the turn-off moment of the controllable switching transistor of the lagging bridge arm and a preset current; and
controlling the on or off of the switch in the inductive branch based on the difference, wherein different differences correspond to different quantities of closed inductive branches.

19. The method according to claim 17, wherein the controlling the on or off of the switch in the inductive branch based on the current flowing out of the lagging bridge arm comprises:
obtaining the current flowing into the compensation circuit, based on the current flowing out of the lagging bridge arm at the turn-off moment of the controllable switching transistor of the lagging bridge arm and a present quantity of closed inductive branches;
determining a difference between the current flowing into the compensation circuit and a preset current; and
controlling on or off of the switch in the inductive branch based on the difference, wherein different differences correspond to different quantities of closed inductive branches.

* * * * *